United States Patent
Yagasaki

(10) Patent No.: US 9,938,892 B2
(45) Date of Patent: Apr. 10, 2018

(54) INTERNAL COMBUSTION ENGINE AND CONTROLLER FOR THE SAME

(71) Applicant: HONDA MOTOR CO., LTD., Tokyo (JP)

(72) Inventor: Toru Yagasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 15/339,939

(22) Filed: Nov. 1, 2016

(65) Prior Publication Data

US 2017/0159553 A1   Jun. 8, 2017

(30) Foreign Application Priority Data

Dec. 2, 2015 (JP) .................................. 2015-235802

(51) Int. Cl.
| | | |
|---|---|---|
| *F01N 5/04* | (2006.01) | |
| *F02B 37/02* | (2006.01) | |
| *F02B 37/18* | (2006.01) | |

(52) U.S. Cl.
CPC .............. *F02B 37/183* (2013.01); *F01N 5/04* (2013.01); *F02B 37/02* (2013.01); *Y02T 10/144* (2013.01); *Y02T 10/16* (2013.01)

(58) Field of Classification Search
CPC .......... F01N 5/04; F02B 37/02; F02B 37/183; Y02T 10/144; Y02T 10/16
USPC ................................................. 60/602, 605.2
See application file for complete search history.

(56) References Cited

U.S. PATENT DOCUMENTS

| | | | | |
|---|---|---|---|---|
| 5,142,868 | A * | 9/1992 | Woon ..................... | F02B 37/005 60/602 |
| 8,555,636 | B2 * | 10/2013 | Schwarzenthal ......... | F01N 5/04 60/605.1 |
| 9,267,442 | B2 * | 2/2016 | Denholm ................... | F02C 9/00 |
| 9,518,506 | B2 * | 12/2016 | Leone ................... | F02B 37/004 |
| 2005/0126169 | A1 * | 6/2005 | Ruess ................... | F01D 17/105 60/612 |
| 2008/0000226 | A1 * | 1/2008 | Arndt ...................... | F01N 3/023 60/599 |
| 2009/0107123 | A1 * | 4/2009 | Vuk ....................... | F01N 3/0253 60/295 |
| 2009/0173071 | A1 * | 7/2009 | Kapich ............... | F02B 29/0425 60/605.2 |

FOREIGN PATENT DOCUMENTS

JP    4892054 B2    7/2010

* cited by examiner

*Primary Examiner* — Audrey K Bradley
*Assistant Examiner* — Dapinder Singh
(74) *Attorney, Agent, or Firm* — Mori & Ward, LLP

(57) ABSTRACT

An internal combustion engine includes an exhaust manifold, a main exhaust passage, an auxiliary exhaust passage, a communicating passage, a first switching mechanism, and a second switching mechanism. The main exhaust passage is connected to the exhaust manifold. The auxiliary exhaust passage is connected to the main exhaust passage. The communicating passage connects with the main exhaust passage and the auxiliary exhaust passage. The first switching mechanism switches a communication state of the exhaust manifold among a first state, a second state, and a third state. The second switching mechanism switches a communication state of the communicating passage with the main exhaust passage among a fourth state, a fifth state, and a sixth state.

18 Claims, 16 Drawing Sheets

INTERNAL COMBUSTION ENGINE AND CONTROLLER FOR THE SAME

CROSS-REFERENCE TO RELATED APPLICATIONS

The present application claims priority under 35 U.S.C. § 119 to Japanese Patent Application No. 2015-235802, filed Dec. 2, 2015, entitled "Internal Combustion Engine and Controller for the Same." The contents of this application are incorporated herein by reference in their entirety.

BACKGROUND

1. Field

The present disclosure relates to an internal combustion engine and a controller for the internal combustion engine.

2. Description of the Related Art

A known internal combustion engine having a power turbine device and a turbo charger device and a controller for the internal combustion engine are described in Japanese Patent No. 4892054. The exhaust system of the internal combustion engine has an exhaust passage, a bypass passage, and a shortcut passage, with a supercharging turbine of a turbo charger device provided at some midpoint of the exhaust passage. The bypass passage, which is used for bypassing the supercharging turbine in the exhaust passage, branches off from the exhaust passage at a point upstream of the supercharging turbine and subsequently merges at a point in the exhaust passage downstream of the supercharging turbine.

An upstream flap is provided at the point where the bypass passage branches off and is configured to be switchable between a state in which the entrance to the exhaust passage on the supercharging turbine side is closed, a state in which the entrance to the bypass passage is closed, and a state in which both the entrances are opened.

The power turbine device includes a rotary machine and a power turbine which is coupled to the rotating shaft of the rotary machine and located at some midpoint of the bypass passage. The shortcut passage branches off from the bypass passage at a point upstream of the power turbine and subsequently merges with the exhaust passage at a point slightly downstream of the supercharging turbine. A downstream flap is provided at the point where the shortcut passage merges and is configured to be switchable between a state in which the exit of the shortcut passage is opened with the exhaust passage downstream of the supercharging turbine closed and a state in which the exhaust passage is opened with the exit of the shortcut passage closed.

With this controller, during high-load, high-revolution operation of the internal combustion engine, the upstream flap is driven so as to open both the entrance of the exhaust passage on the supercharging turbine side and the entrance of the bypass passage, while the downstream flap is driven so as to open the exhaust passage with the exit of the shortcut passage closed, as illustrated in FIG. 2 of Japanese Patent No. 4892054. This directs exhaust gas from an exhaust manifold to both the supercharging turbine side and the power turbine side, and after passing through them, the two flows of exhaust gas meet at the merging point of the bypass passage and the exhaust passage and further flows down the exhaust passage.

During this process, the thermal energy of the exhaust gas is transformed into kinetic energy when it passes through the supercharging turbine to be utilized for supercharging action of the turbo charger device. When charging of a battery is possible, the thermal energy is transformed into kinetic energy when it passes through the power turbine and the kinetic energy is converted to electric power through regenerative control on the rotary machine to be stored in the battery.

In a cold start of the internal combustion engine, the upstream flap is driven so that the entrance to the bypass passage is opened with the entrance to the exhaust passage on the supercharging turbine side closed and the downstream flap is driven so that the exhaust passage is closed, as illustrated in FIG. 3 of Japanese Patent No. 4892054. This directs the exhaust gas from the exhaust manifold only to the power turbine. Then, in order to suction secondary air into the exhaust manifold, a negative pressure is produced in the exhaust passage downstream of the exhaust manifold through powering control of the rotary machine.

SUMMARY

According to one aspect of the present invention, an internal combustion engine includes an exhaust manifold, a main exhaust passage, an auxiliary exhaust passage, a turbo charger device, a power turbine device, a communicating passage, a first switching element, and a second switching element. Exhaust gas from the exhaust manifold flows into the main exhaust passage. The auxiliary exhaust passage is formed separately from the main exhaust passage such that exhaust gas from the exhaust manifold flows in. The turbo charger device includes a supercharging turbine disposed at some midpoint of the main exhaust passage. The power turbine device includes power turbines disposed at some midpoint of the auxiliary exhaust passage and a rotary machine coupled to the power turbines. One end of the communicating passage is connected with the main exhaust passage at a point downstream of the supercharging turbine. Another end of the communicating passage is connected with the auxiliary exhaust passage at a point upstream of the power turbines. The communicating passage communicates with the main exhaust passage and the auxiliary exhaust passage. The first switching element is configured to switch a communication state of the exhaust manifold between a state in which the exhaust manifold communicates only with a main exhaust passage side, a state in which the exhaust manifold communicates only with an auxiliary exhaust passage side, and a state in which the exhaust manifold communicates with both the main exhaust passage side and the auxiliary exhaust passage side. The second switching element is configured to switch the communication state of the communicating passage with the main exhaust passage between a state in which the communicating passage communicates with the main exhaust passage only on an upstream side of a point of connection with the communicating passage, a state in which the communicating passage communicates with the main exhaust passage on both upstream and downstream sides of the point of connection with the communicating passage, and a state in which the communicating passage does not communicate with the main exhaust passage.

According to another aspect of the present invention, an internal combustion engine includes an exhaust manifold, a main exhaust passage, an auxiliary exhaust passage, a turbo charger, a power turbine apparatus, a communicating passage, a first switching mechanism, and a second switching mechanism. The main exhaust passage is connected to the exhaust manifold such that exhaust gas from the exhaust manifold flows into the main exhaust passage. The auxiliary exhaust passage is connected to the main exhaust passage at a branch portion such that the exhaust gas from the exhaust manifold flows into the auxiliary exhaust passage. The turbo charger includes a supercharging turbine disposed at the main exhaust passage. The power turbine apparatus includes a power turbine and a rotary. The power turbine is disposed at the auxiliary exhaust passage. The rotary is coupled to the power turbine. The communicating passage connects with the main exhaust passage and the auxiliary exhaust passage. The communicating passage has one end and another end. The one end is connected with the main exhaust passage at a downstream point with respect to the supercharging turbine. The another end is connected with the auxiliary exhaust passage at an upstream point with respect to the power turbine. The first switching mechanism switches a communication state of the exhaust manifold among a first state in which the exhaust manifold communicates with the main exhaust passage and does not communicate with the auxiliary exhaust passage, a second state in which the exhaust manifold communicates with the auxiliary exhaust passage and does not communicate with the main exhaust passage, and a third state in which the exhaust manifold communicates with both the main exhaust passage and the auxiliary exhaust passage. The second switching mechanism switches a communication state of the communicating passage with the main exhaust passage among a fourth state in which the communicating passage communicates with an upstream main exhaust passage of the main exhaust passage located on an upstream side with respect to a connection point at which the main exhaust passage connects with the communicating passage and does not communicate with a downstream main exhaust passage of the main exhaust passage located on a downstream side with respect to the connection point, a fifth state in which the communicating passage communicates with both the upstream main exhaust passage and the downstream main exhaust passage, and a sixth state in which the communicating passage does not communicate with the main exhaust passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
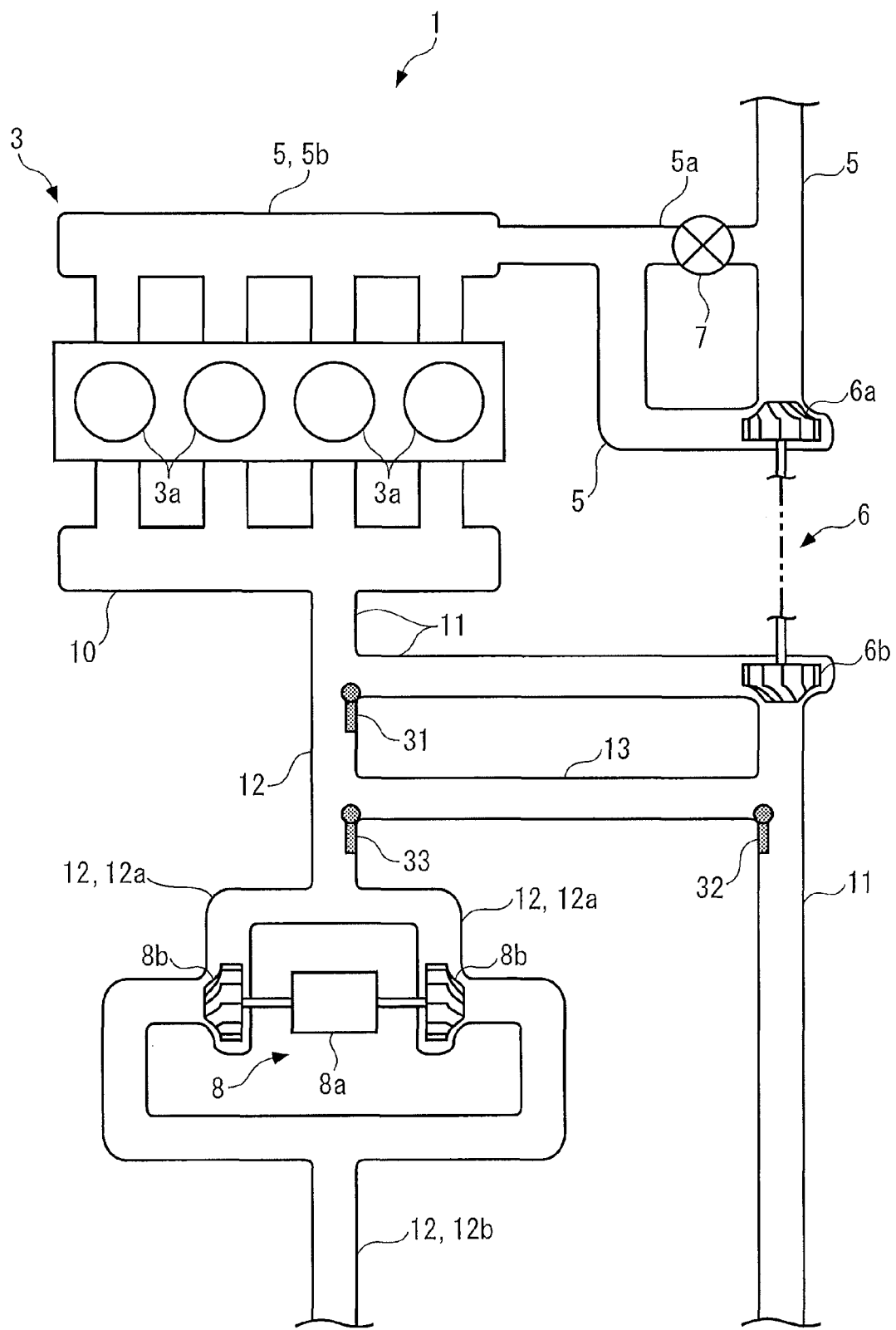
FIG. 1 schematically shows the configuration of an internal combustion engine and a controller for the internal combustion engine according to a first embodiment of the present disclosure.

The embodiments will now be described with reference to the accompanying drawings, wherein like reference numerals designate corresponding or identical elements throughout the various drawings.

Figure 2:
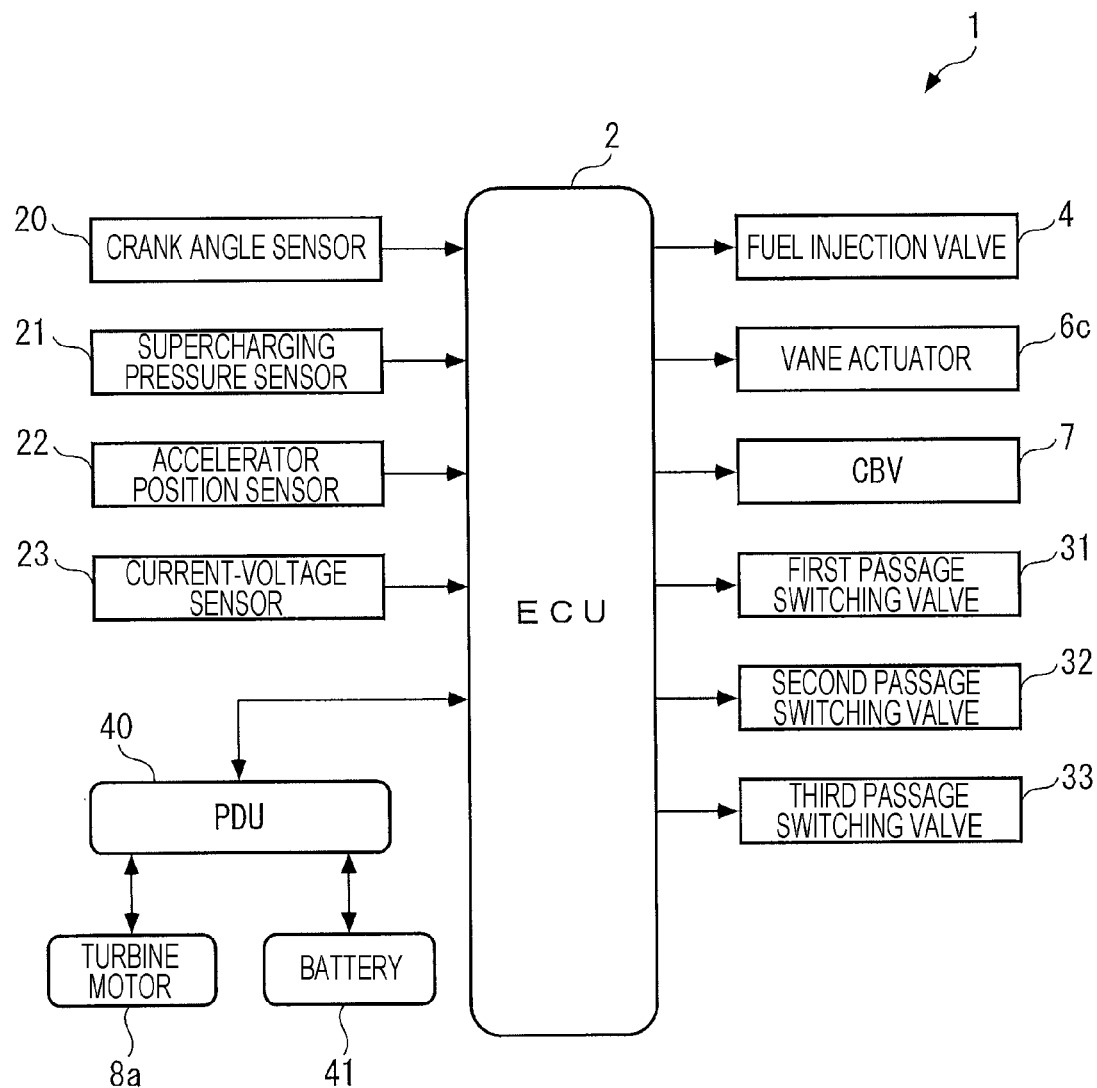
FIG. 2 is a block diagram showing the electrical configuration of the controller.

The internal combustion engine and a controller for the internal combustion engine according to a first embodiment of the present disclosure will be described below with reference to drawings. As shown in FIG. 2, a controller 1 in the first embodiment includes an ECU 2, which executes a supercharging control process in an internal combustion engine 3 shown in FIG. 1.

The internal combustion engine (hereinafter referred to as "engine") 3 is of a diesel engine type and incorporated in a vehicle (not shown) as the power source. The engine 3 includes four cylinders 3a and fuel injection valves 4 (only one shown in FIG. 2) provided for the respective cylinders 3a. The fuel injection valves 4 are electrically connected with the ECU 2 and the timing of their opening and closing is controlled by the ECU 2 so that the amount and timing of fuel injection by the fuel injection valves 4 are controlled. That is, a fuel injection control process is executed.

The engine 3 is equipped with a turbo charger device 6. The turbo charger device 6 is of a variable capacity type, including a compressor 6a disposed at some midpoint of an air intake passage 5, a supercharging turbine 6b disposed at some midpoint of a main exhaust passage 11 described later and rotating integrally with the compressor 6a, multiple variable vanes (not shown), and a vane actuator 6c for driving the variable vanes (see FIG. 2).

In the turbo charger device 6, when the supercharging turbine 6b rotates by being driven by the exhaust gas in the main exhaust passage 11, the compressor 6a, which is integral with the supercharging turbine 6b, simultaneously rotates, so that the air within the air intake passage 5 is pressurized, that is, supercharging action is executed. The variable vanes serve to vary the supercharging pressure generated by the turbo charger device 6. They are rotatably attached to a wall of a housing in a portion in which the supercharging turbine 6b is accommodated and are mechanically coupled to the vane actuator 6c.

The ECU 2 varies the speed of rotation of the supercharging turbine 6b, namely the speed of rotation of the compressor 6a, by varying the degree of opening of the variable vanes via the vane actuator 6c and changing the amount of exhaust gas blown to the supercharging turbine 6b. The supercharging pressure is thereby controlled.

The air intake passage 5 has a compressor bypass passage 5a for bypassing the compressor 6a, with a compressor bypass valve (hereinafter referred to as "CBV") 7 provided at some midpoint of the compressor bypass passage 5a. The CBV 7 is a combination of an electric actuator and a valve member driven by it (neither shown). The CBV 7 is electrically connected with the ECU 2 and controlled between the fully closed state and the fully open state by a control input signal from the ECU 2.

When the CBV 7 is controlled in the fully open state, the compressor bypass passage 5a is opened. Because the compressor 6a assumes the channel resistance in response to it, the air in the air intake passage 5 mostly flows to the compressor bypass passage 5a side, with little flowing to the compressor 6a side (see FIGS. 4 and 8).

When the CBV 7 is controlled in the fully closed state, the compressor bypass passage 5a is closed. In response to it, the air in the air intake passage 5 flows only to the compressor 6a side, creating a state in which supercharging action by the turbo charger device 6 is possible (see FIGS. 5 to 7).

The exhaust system of the engine 3 further includes an exhaust manifold 10 into which exhaust gas flows from the cylinders 3a, a main exhaust passage 11 extending from the exhaust manifold 10, an auxiliary exhaust passage 12 which branches off from the main exhaust passage 11, and a communicating passage 13 extending between the main exhaust passage 11 and the auxiliary exhaust passage 12.

In the main exhaust passage 11, a first passage switching valve 31, the supercharging turbine 6b mentioned above, and a second passage switching valve 32 are provided in this order from the upstream side. The first passage switching valve 31, which is a motor-operated valve, is electrically connected with the ECU 2 and positioned at a point where the auxiliary exhaust passage 12 branches off from the main exhaust passage 11. The first passage switching valve 31 is controlled between the origin position shown in FIG. 1, the non-supercharging position shown in FIG. 4, and the supercharging position shown in FIG. 5 by a control input signal from the ECU 2.

When the first passage switching valve 31 is in the origin position, the exhaust manifold 10 is in a state in which it communicates with both the main exhaust passage 11 and the auxiliary exhaust passage 12. When the first passage switching valve 31 is in the non-supercharging position, the exhaust manifold 10 is in a state in which it communicates only with the auxiliary exhaust passage 12. When the first passage switching valve 31 is in the supercharging position, the exhaust manifold 10 is in a state in which it communicates only with the main exhaust passage 11.

The second passage switching valve 32, which is a motor-operated valve similar to the first passage switching valve 31, is electrically connected with the ECU 2 and positioned at the point of connection of the communicating passage 13 and the main exhaust passage 11. The second passage switching valve 32 is controlled between the origin position shown in FIG. 1, the non-communicating position shown in FIG. 5, and the passage closing position shown in FIG. 6 by a control input signal from the ECU 2.

When the second passage switching valve 32 is in the origin position, the communicating passage 13 is in a state in which it communicates with the main exhaust passage 11 on both the upstream and downstream sides of the point of connection with the main exhaust passage 11. When the second passage switching valve 32 is in the non-communicating position, the communicating passage 13 is in a state in which it does not communicate with the main exhaust passage 11. When the second passage switching valve 32 is in the passage closing position, the communicating passage 13 is in a state in which it communicates with the main exhaust passage 11 only on the upstream side of the point of connection with the main exhaust passage 11.

The auxiliary exhaust passage 12 extends branching off from the main exhaust passage 11 at a point upstream of the supercharging turbine 6b. The auxiliary exhaust passage 12 has two branch passage portions 12a, 12a which branch off downstream of the point of connection with the communicating passage 13, and a merging passage portion 12b which is a single passage into which the branch passage portions 12a, 12a merge on the downstream side. In the auxiliary exhaust passage 12, a third passage switching valve 33 and a power turbine device 8 are provided in this order from the upstream side.

The third passage switching valve 33, which is a motor-operated valve similar to the two passage switching valves 31 and 32 above, is electrically connected with the ECU 2 and positioned in the auxiliary exhaust passage 12 at the point of connection with the communicating passage 13. The third passage switching valve 33 is controlled between the origin position shown in FIG. 1, the passage closing position shown in FIG. 4, and the non-communicating position shown in FIG. 7 by a control input signal from the ECU 2.

When the third passage switching valve 33 is in the origin position, the communicating passage 13 is in a state in which it communicates with the auxiliary exhaust passage 12 on both the upstream and downstream sides of the point of connection with the auxiliary exhaust passage 12. When the third passage switching valve 33 is in the passage closing position, the communicating passage 13 is in a state in which it communicates with the auxiliary exhaust passage 12 only on the upstream side of the point of connection with the auxiliary exhaust passage 12. When the third passage switching valve 33 is in the non-communicating position, the communicating passage 13 is in a state in which it does not communicate with the auxiliary exhaust passage 12.

The three passage switching valves 31 to 33 are all kept in the origin position when no control input signal is being supplied from the ECU 2. In this embodiment, the first passage switching valve 31 corresponds to a first switching element, the second passage switching valve 32 corresponds to a second switching element, and the third passage switching valve 33 corresponds to a third switching element.

The power turbine device 8 above includes a turbine motor 8a as a rotary machine, and a pair of power turbines 8b, 8b concentrically fixed to the ends of the rotating shaft of the turbine motor 8a. The power turbines 8b, 8b are disposed at some midpoint of the branch passage portions 12a, 12a respectively.

The turbine motor 8a, which may be a brushless DC motor, for example, is electrically connected with the ECU 2 and a battery 41 via a PDU 40 as shown in FIG. 2. The PDU 40 is formed from an electrical circuit including an inverter and the like, and the ECU 2 controls exchange of electrical power between the turbine motor 8a and the battery 41 via the PDU 40. Specifically, it executes regenerative control and powering control on the turbine motor 8a.

In the power turbine device 8, the pair of power turbines 8b, 8b have the same size and shape as each other and are constructed such that the two flows of exhaust gas that have passed through the power turbines 8b, 8b, are discharged in the opposite directions to each other along the axis of rotation of the turbine motor 8a. Consequently, when the power turbines 8b, 8b rotate by being driven by the exhaust gas flowing in the auxiliary exhaust passage 12, the thrust power generated in one of the power turbines 8b, 8b acts toward the thrust power generated in the other power turbine 8b, resulting in mutual cancellation of the thrust power.

Thus, unlike a power turbine device having only one power turbine, such as Japanese Patent No. 4892054 (the entire contents of which are incorporated herein by reference), the power turbine device 8 can avoid increase in rotational resistance associated with thrust power, if any, generated by the rotation of the power turbines 8b, 8b.

The ECU 2 is electrically connected with a crank angle sensor 20, a supercharging pressure sensor 21, an accelerator position sensor 22, and a current-voltage sensor 23 as shown in FIG. 2.

The crank angle sensor 20 outputs a CRK signal, which is a pulse signal, to the ECU 2 in response to rotation of a crank shaft (not shown). The CRK signal of one pulse is output per predetermined crank angle (for example, 2°), and based on the CRK signal, the ECU 2 computes the number of revolutions of the engine 3 (hereinafter referred to as "engine r.p.m") NE.

The supercharging pressure sensor 21 detects a supercharging pressure PB, which is the pressure in the air intake passage 5 on the downstream side of the compressor 6a, and outputs a detection signal representing it to the ECU 2. The accelerator position sensor 22 detects the amount of pressing of an accelerator pedal (not shown) of the vehicle (hereinafter referred to as "accelerator position") AP and outputs a detection signal representing it to the ECU 2.

The current-voltage sensor 23 outputs a detection signal representing the current and voltage values input to and output from the battery 41, to the ECU 2. Based on the detection signal from the current-voltage sensor 23, the ECU 2 computes the percentage of storage of electrical power in the battery 41, namely the state of charge SOC.

The ECU 2 is a microcomputer which may include a CPU, RAM, ROM, and an I/O interface (all not shown), and executes various kinds of control process, such as supercharging control as described below, in accordance with detection signals from the foregoing sensors 20 to 23. In this embodiment, the ECU 2 corresponds to an NA operation area determination unit, an NA operation control unit, a parallel operation area determination unit, and a parallel operation control unit.

Figure 3:
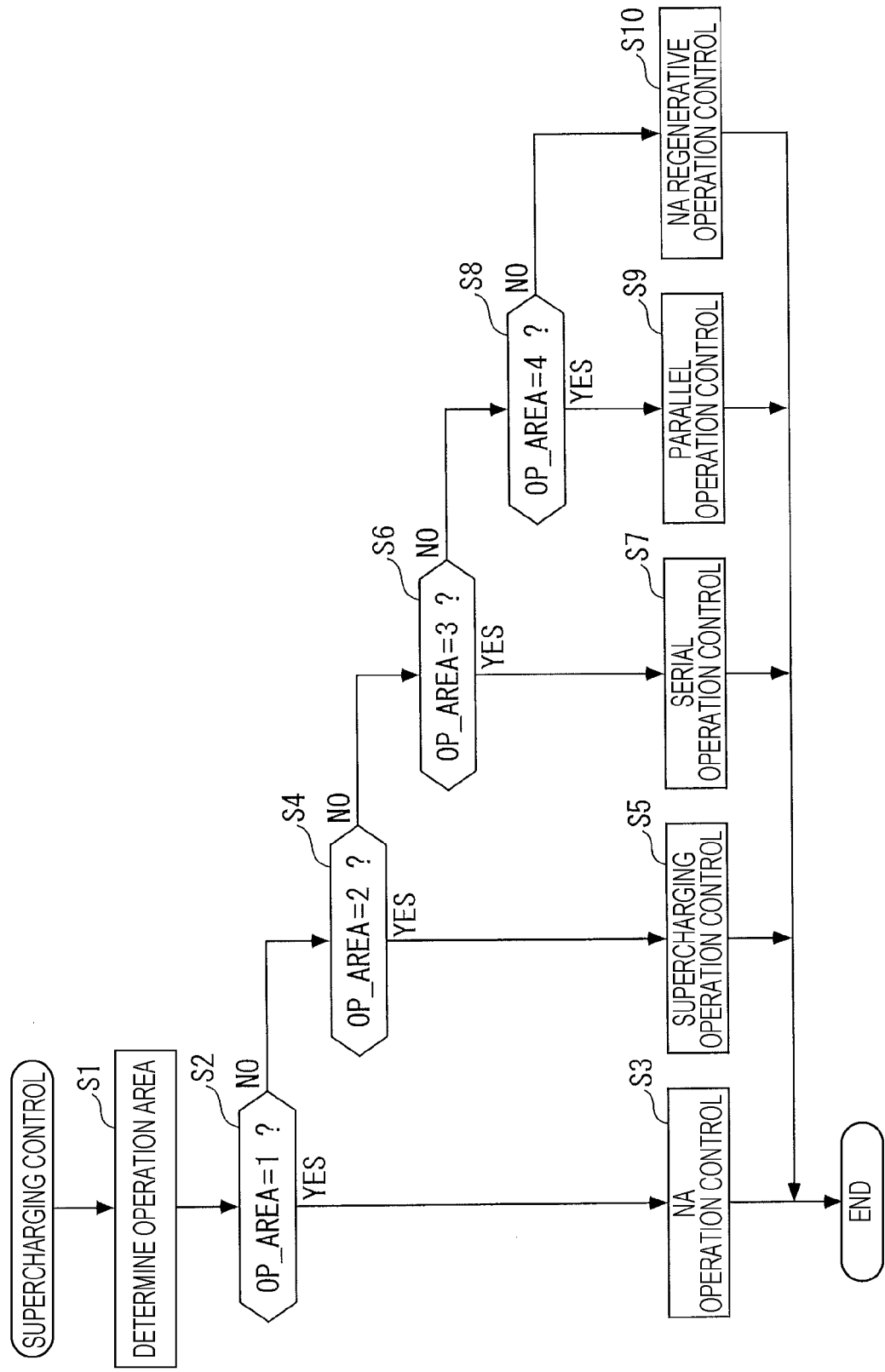
FIG. 3 is a flowchart illustrating a supercharging control process.

Turning now to FIG. 3, the supercharging control process will be discussed. The supercharging control process controls the supercharging pressure PB by controlling the operation states of the turbo charger device 6, the CBV 7, the power turbine device 8, and the three passage switching valves 31 to 33 described above, being executed at intervals of a predetermined control period (for example, 10 msec) by the ECU 2.

As shown in FIG. 3, first at step 1 (abbreviated as "S1" in FIG. 3, which also applies to the following), an operation area determination process is performed. In the operation area determination process, a required torque TRQ is computed by looking up a map (not shown) in accordance with the accelerator position AP and the engine r.p.m NE, and the state of charge SOC is computed in accordance with the detection signal from the current-voltage sensor 23. As the required torque TRQ, the engine r.p.m NE, and the state of charge SOC are parameters representing the operation area of the engine 3 and other components, the three values TRQ, NE, and SOC will be collectively called "operation area parameters" in the following text.

Next, by looking up a map (not shown) in accordance with the operation area parameters, an operation area determination value OP_AREA is set. More specifically, the operation area determination value OP_AREA is set to value 1 when the operation area parameters fall in the NA operation area, to value 2 when the operation area parameters fall in the supercharging operation area, to value 3 when the operation area parameters fall in the serial operation area, to value 4 when the operation area parameters fall in the parallel operation area, and to value 5 when the operation area parameters fall in the NA regenerative operation area.

The NA operation area is an area in which natural aspiration operation of the engine 3 is to be executed by not allowing the exhaust gas from the exhaust manifold 10 to flow into either the supercharging turbine 6b or the power turbines 8b. The supercharging operation area is an area in which supercharging operation of the engine 3 is to be executed by allowing the exhaust gas from the exhaust manifold 10 to flow only into the supercharging turbine 6b. The serial operation area is an area in which regenerative control or powering control on the turbine motor 8a is to be executed while performing supercharging operation of the engine 3 by making the exhaust gas from the exhaust manifold 10 flow into the supercharging turbine 6b and the power turbines 8b in this order.

The parallel operation area is an area in which regenerative control on the turbine motor 8a is to be executed while performing the supercharging operation of the engine 3 by distributing the exhaust gas from the exhaust manifold 10 between the supercharging turbine 6b and the power turbines 8b. The NA regenerative operation area is an area in which regenerative control on the turbine motor 8a is to be executed while executing the natural aspiration operation of the engine 3 by making the exhaust gas from the exhaust manifold 10 flow only to the power turbines 8b.

After the operation area determination process is performed at step 1 as described above, determination is made at step 2 as to whether the operation area determination value OP_AREA is value 1 or not. If this determination results in YES, that is, if the operation area parameters are in the NA operation area, it is determined that natural aspiration operation of the engine 3 is to be executed. Then, at step 3, an NA operation control process is executed as described below.

In the NA operation control process, the CBV 7 is controlled into the fully open state. This causes the air in the air intake passage 5 (hereinafter referred to as "intake air") to flow as indicated by arrow Y1 in FIG. 4. That is, because the compressor 6a is at the channel resistance, most part of the intake air flows to the compressor bypass passage 5a side and then flows into the intake manifold 5b, with little flowing to the compressor 6a side.

Figure 4:
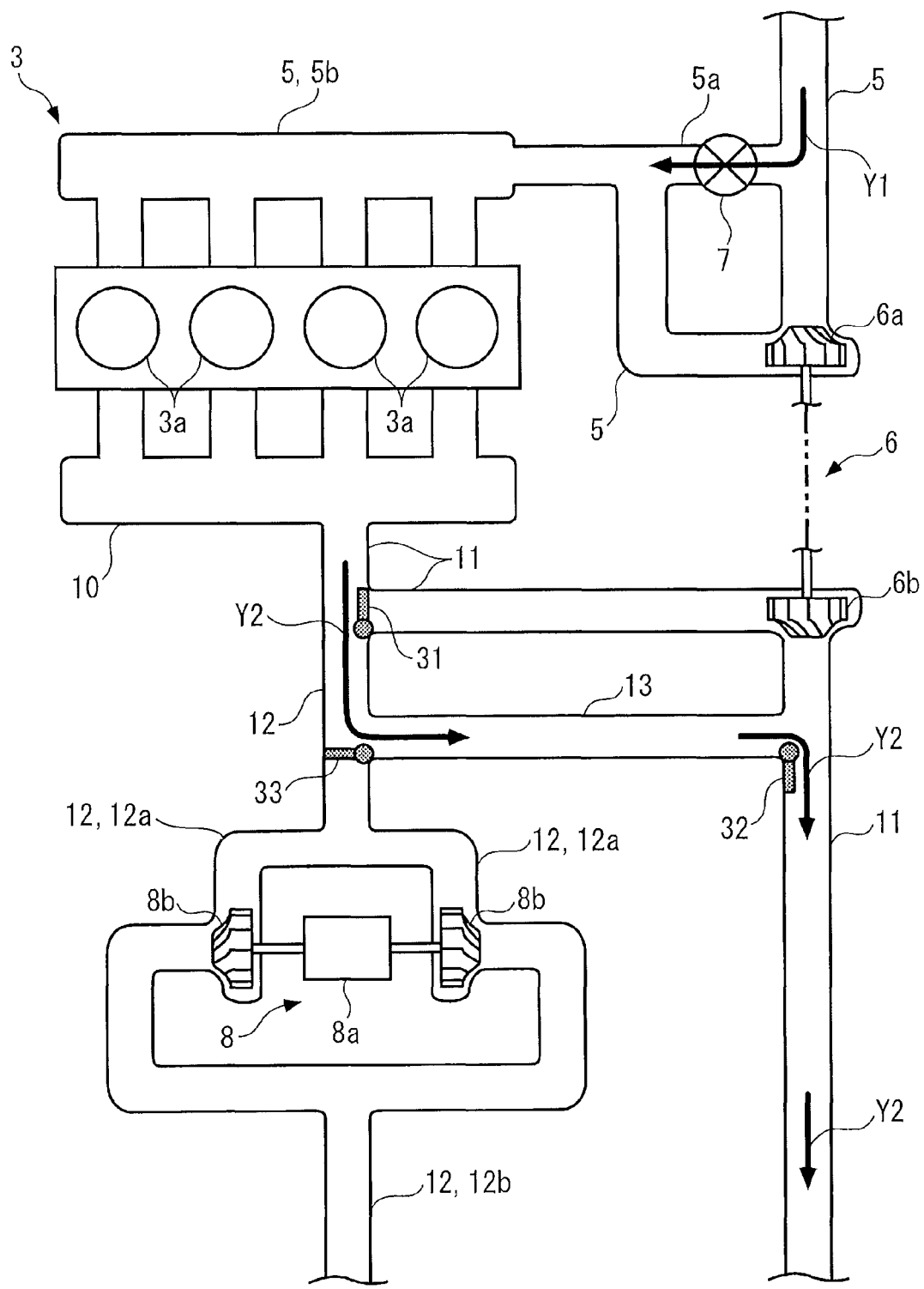
FIG. 4 illustrates the flows of intake air and exhaust gas during execution of an NA operation control process.

Also, as shown in FIG. 4, the first passage switching valve 31 is controlled to the non-supercharging position, the second passage switching valve 32 is controlled to the origin position, and the third passage switching valve 33 is controlled to the passage closing position. This causes the exhaust gas discharged into the exhaust manifold 10 from the cylinders 3a to flow as indicated by arrow Y2 in FIG. 4.

That is, from the exhaust manifold 10, the exhaust gas flows into the main exhaust passage 11, the auxiliary exhaust passage 12, and the communicating passage 13 in this order, then re-enters the main exhaust passage 11, and further flows down the main exhaust passage 11. During execution of the NA operation control process, exhaust gas flows in the individual passages without flowing to the supercharging turbine 6b side or the power turbine 8b side as described above, so the exhaust resistance becomes minimum. The NA operation control process is accordingly executed during low-load, low-revolution operation, such as at the startup of the engine.

After the NA operation control process is performed at step 3 as described above, the control flow ends.

Meanwhile, when the determination in step 2 results in NO, that is, if the operation area parameters are not in the NA operation area, then at step 4, determination is made as to whether the operation area determination value OP_AREA is value 2 or not. If this determination results in YES, that is, if the operation area parameters are in the supercharging operation area, it is determined that supercharging operation of the engine 3 is to be executed. Then, at step 5, a supercharging operation control process is executed as described below.

In the supercharging operation control process, the CBV 7 is controlled into the fully closed state. This causes all the intake air to flow to the compressor 6a side as indicated by arrow Y1 in FIG. 5. The intake air then flows into the intake manifold 5b while being pressurized by the compressor 6a in supercharging operation as discussed later.

Figure 5:
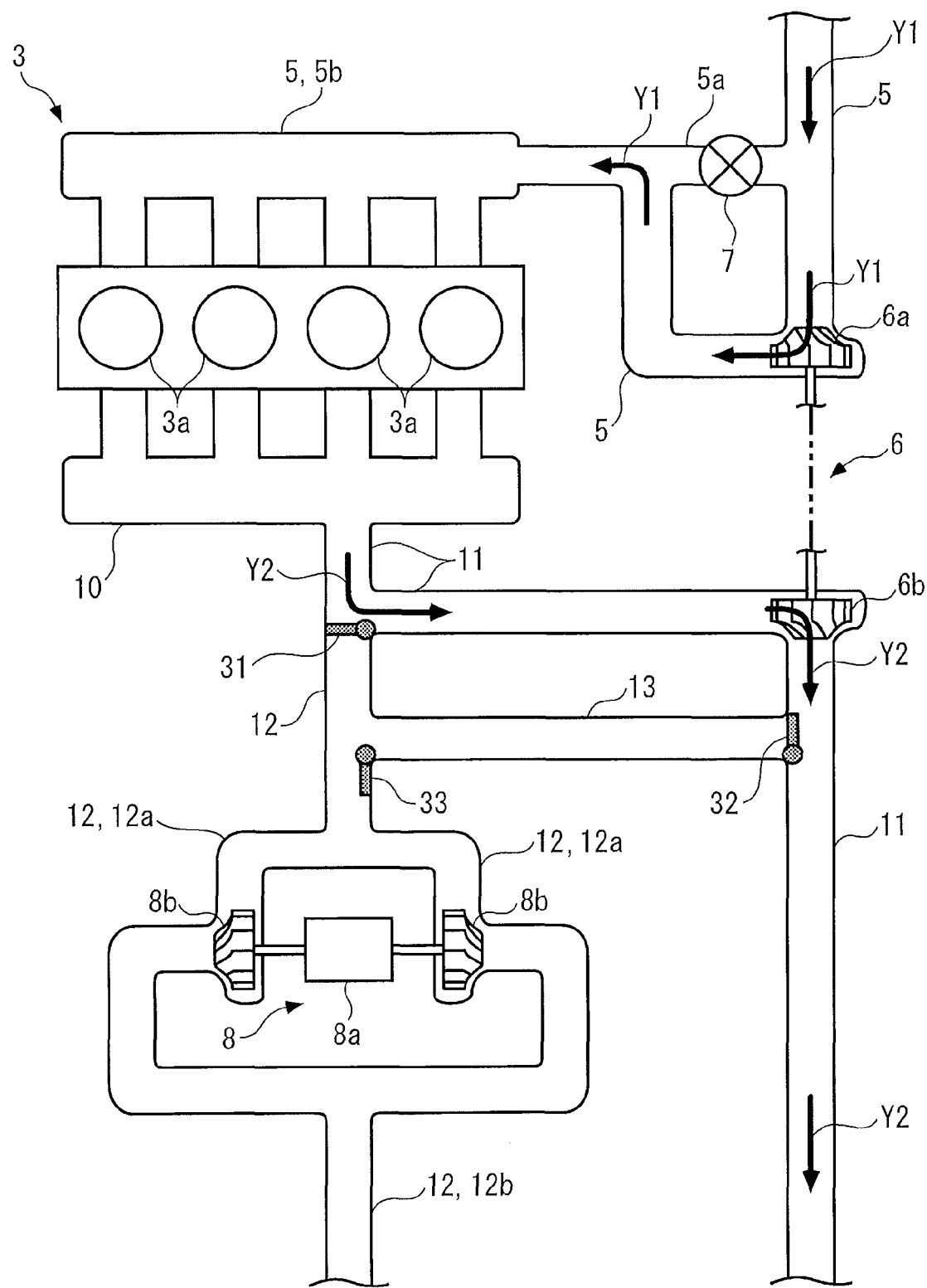
FIG. 5 illustrates the flows of intake air and exhaust gas during execution of a supercharging operation control process.

Also, as shown in FIG. 5, the first passage switching valve 31 is controlled to the supercharging position, and the second passage switching valve 32 is controlled to the non-communicating position. This causes the exhaust gas discharged into the exhaust manifold 10 from the cylinders 3a to flow as indicated by arrow Y2 in FIG. 5. That is, the exhaust gas flows into the main exhaust passage 11 from the exhaust manifold 10, passes through the supercharging turbine 6b, and then further flows down the main exhaust passage 11.

Further, supercharging action is executed by the turbo charger device 6. Specifically, a target opening for the variable vanes is computed in accordance with the required torque TRQ and the engine r.p.m NE, and the actual opening of the variable vanes is controlled to the target opening by driving the vane actuator 6c. As a result, intake air is pressurized by the compressor 6a, so that the supercharging pressure PB is controlled to the value corresponding to the target opening. As described above, because supercharging action by the turbo charger device 6 is executed during the supercharging operation control process, the supercharging operation control process is executed during medium to high load operation, for example.

After the supercharging operation control process is executed at step 5 as described above, the control flow ends.

When the determination in step 4 results in NO, that is, when the operation area parameters are not in the supercharging operation area, then at step 6, determination is made as to whether the operation area determination value OP_AREA is value 3 or not. If this determination results in YES, that is, if the operation area parameters are in the serial operation area, the serial operation control process is executed at step 7 as described below.

In the serial operation control process, the CBV 7 is controlled into the fully closed state. This causes all of the intake air to flow to the compressor 6a side as indicated by arrow Y1 in FIG. 6. The intake air then flows into the intake manifold 5b while being pressurized by the compressor 6a in supercharging operation as described later.

Figure 6:
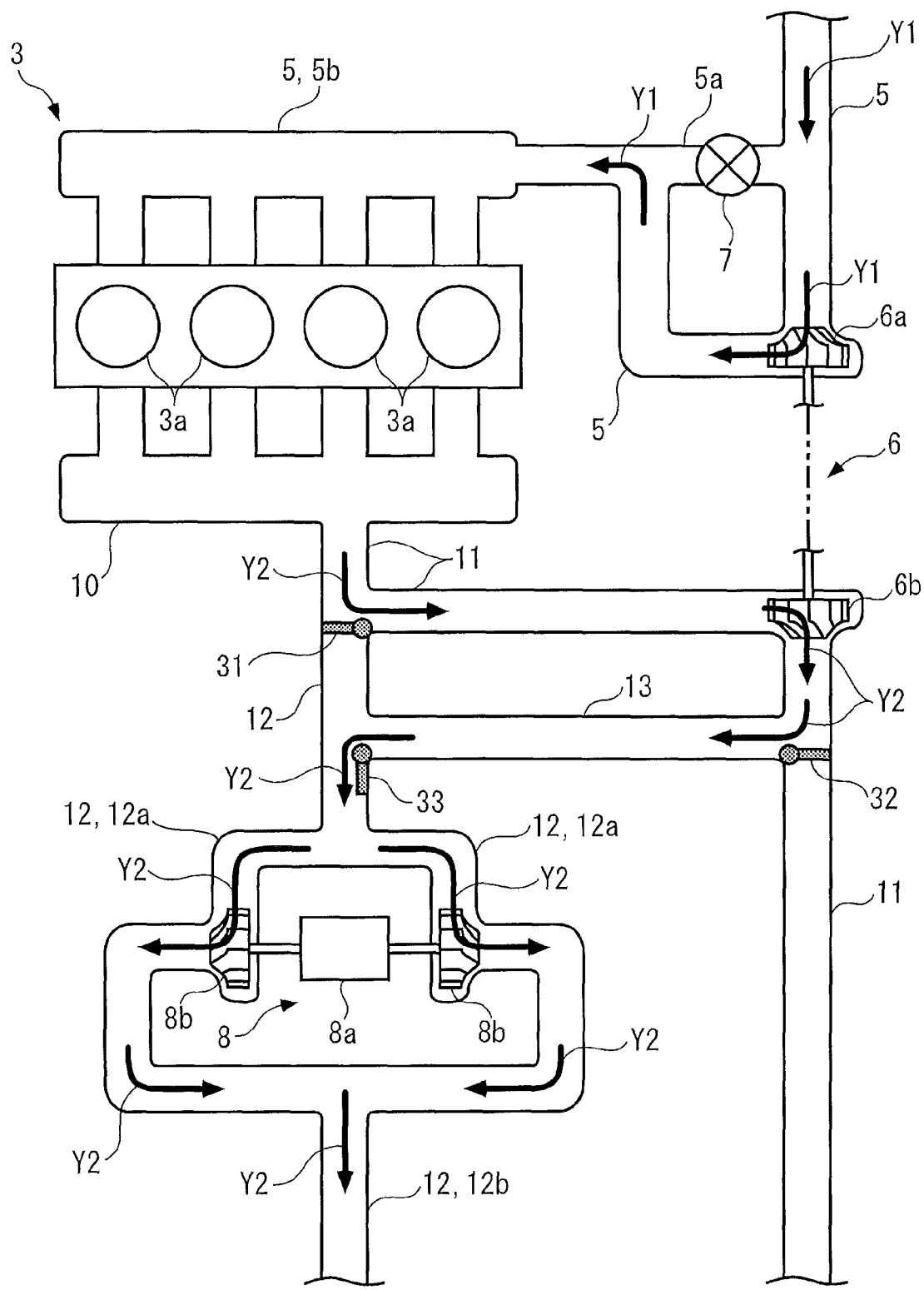
FIG. 6 illustrates the flows of intake air and exhaust gas during execution of a serial operation control process.

Also, as shown in FIG. 6, the first passage switching valve 31 is controlled to the supercharging position, the second passage switching valve 32 is controlled to the passage closing position, and the third passage switching valve 33 is controlled to the origin position. This causes the exhaust gas discharged into the exhaust manifold 10 from the cylinders 3a to flow as indicated by arrow Y2 in FIG. 6. That is, the exhaust gas flows into the main exhaust passage 11 from the exhaust manifold 10, passes through the supercharging turbine 6b, and then flows into the communicating passage 13 from the main exhaust passage 11. It then flows into the auxiliary exhaust passage 12 from the communicating passage 13. It then flows into the branch passage portions 12a, 12a, passes through the power turbines 8b, 8b, and then merges and further flows down the merging passage portion 12b.

Further, supercharging action is executed by the turbo charger device 6. Specifically, the target opening is computed in the same manner as in the foregoing supercharging operation control process and the actual opening of the variable vanes is controlled to the target opening. As a result, intake air is pressurized by the compressor 6a, so that the supercharging pressure PB is controlled to the value corresponding to the target opening.

Additionally, regenerative control or powering control on the turbine motor 8a of the power turbine device 8 is executed in accordance with the operation area parameters. As described, during execution of the serial operation control process, supercharging action by the turbo charger device 6 and regenerative control or powering control on the turbine motor 8a are executed. Accordingly, when the serial operation control process is executed under an operation condition which requires high response due to sharp increase in the accelerator position AP and sharp increase in the required torque TRQ, supercharging action by the turbo charger device 6 and powering control on the turbine motor 8a are executed. In contrast, when the serial operation control process is executed such as during high-load operation with the state of charge SOC lower than a predetermined value, supercharging action by the turbo charger device 6 and regenerative control on the turbine motor 8a are executed.

After the serial operation control process is performed in step 7 as described above, the control flow ends.

When the determination in step 6 results in NO, that is, when the operation area parameters are not in the serial operation area, then at step 8, determination is made as to whether the operation area determination value OP_AREA is value 4 or not. If this determination results in YES, that is, when the operation area parameters are in the parallel operation area, a parallel operation control process is executed at step 9 as described below.

In the parallel operation control process, the CBV 7 is controlled into the fully closed state. This causes all of the intake air to flow to the compressor 6a side as indicated by arrow Y1 in FIG. 7. The intake air then flows into the intake manifold 5b while being pressurized by the compressor 6a in supercharging operation as discussed later.

Figure 7:
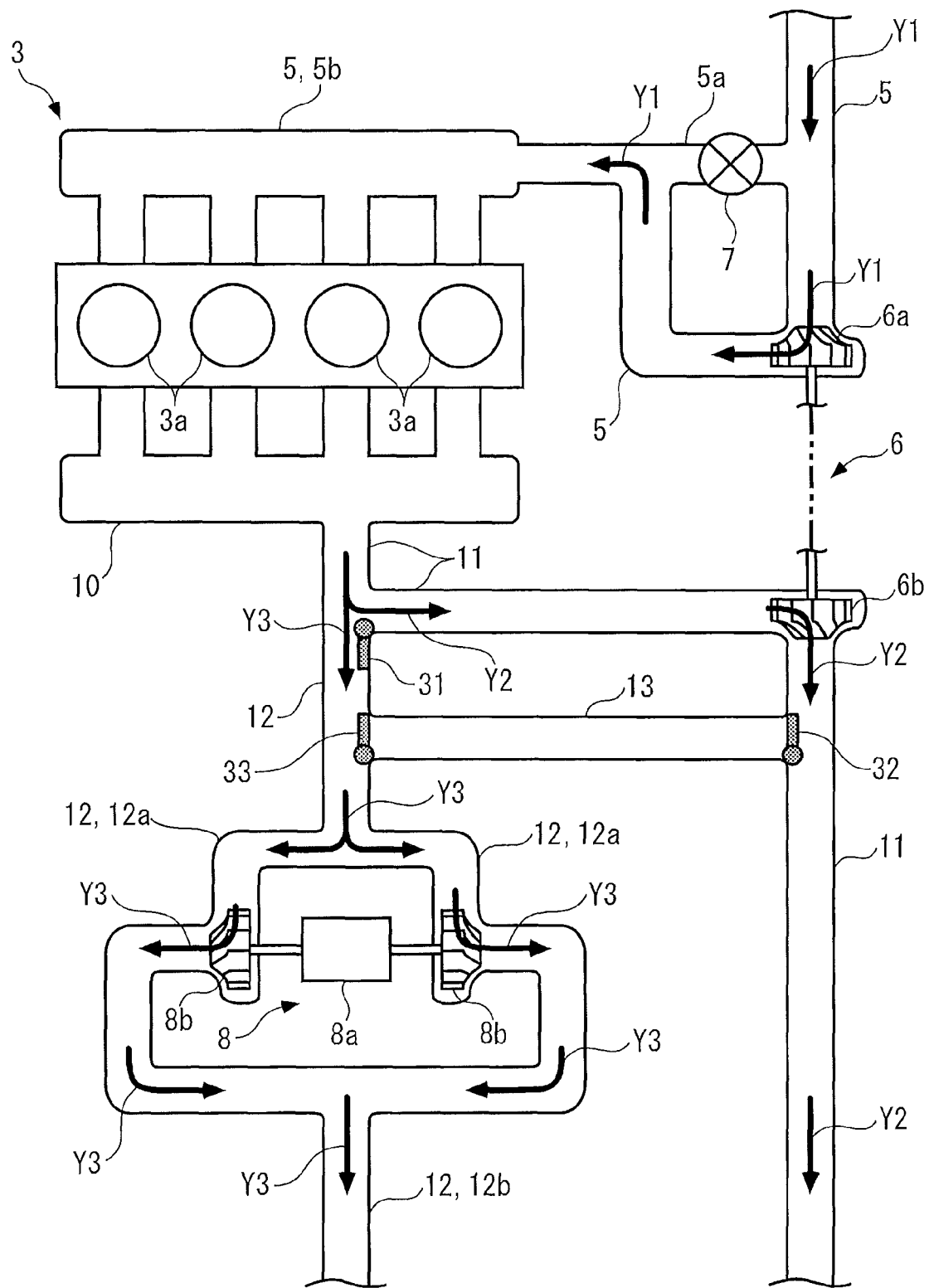
FIG. 7 illustrates the flows of intake air and exhaust gas during execution of a parallel operation control process.

Meanwhile, as shown in FIG. 7, the first passage switching valve 31 is controlled to the origin position, the second passage switching valve 32 is controlled to the non-communicating position, and the third passage switching valve 33 is controlled to the non-communicating position. This causes the exhaust gas discharged to the exhaust manifold 10 from the cylinders 3a to flow as indicated by arrows Y2 and Y3 in FIG. 7. That is, the exhaust gas flows into the main exhaust passage 11 from the exhaust manifold 10, and then divides into the main exhaust passage 11 and the auxiliary exhaust passage 12. The exhaust gas flowing to the main exhaust passage 11 side passes through the supercharging turbine 6b and then flows down the main exhaust passage 11 as indicated by arrow Y2. Meanwhile, the exhaust gas flowing to the auxiliary exhaust passage 12 divides into the branch passage portions 12a, 12a, passes through the power turbines 8b, 8b, and then merges and further flows down the merging passage portion 12b as indicated by arrow Y3.

Further, supercharging action is executed by the turbo charger device 6. Specifically, the target opening is computed in the same manner as in the foregoing supercharging operation control process and the actual opening of the variable vanes is controlled to the target opening. As a result, the supercharging pressure PB is controlled to the value corresponding to the target opening.

In addition, regenerative control on the turbine motor 8a of the power turbine device 8 is executed in accordance with the operation area parameters. As described above, during execution of the parallel operation control process, supercharging action by the turbo charger device 6 and regenerative control on the turbine motor 8a are executed. The parallel operation control process is accordingly executed when surplus exhaust energy is generated even with execution supercharging by the turbo charger device 6, such as during high speed navigation with high load operation.

After the parallel operation control process is performed at step 9 as described above, the control flow ends.

When the determination in step 8 results in NO, that is, when the operation area determination value OP_AREA=5 holds, then the NA regenerative operation control process is executed in step 10 as described below.

In the NA regenerative operation control process, the CBV 7 is controlled into the fully open state. As a result, for the reason described earlier, most part of the intake air flows to the compressor bypass passage 5a and then flows into the intake manifold 5b, with little flowing to the compressor 6a side, as indicated by arrow Y1 in FIG. 8.

Figure 8:
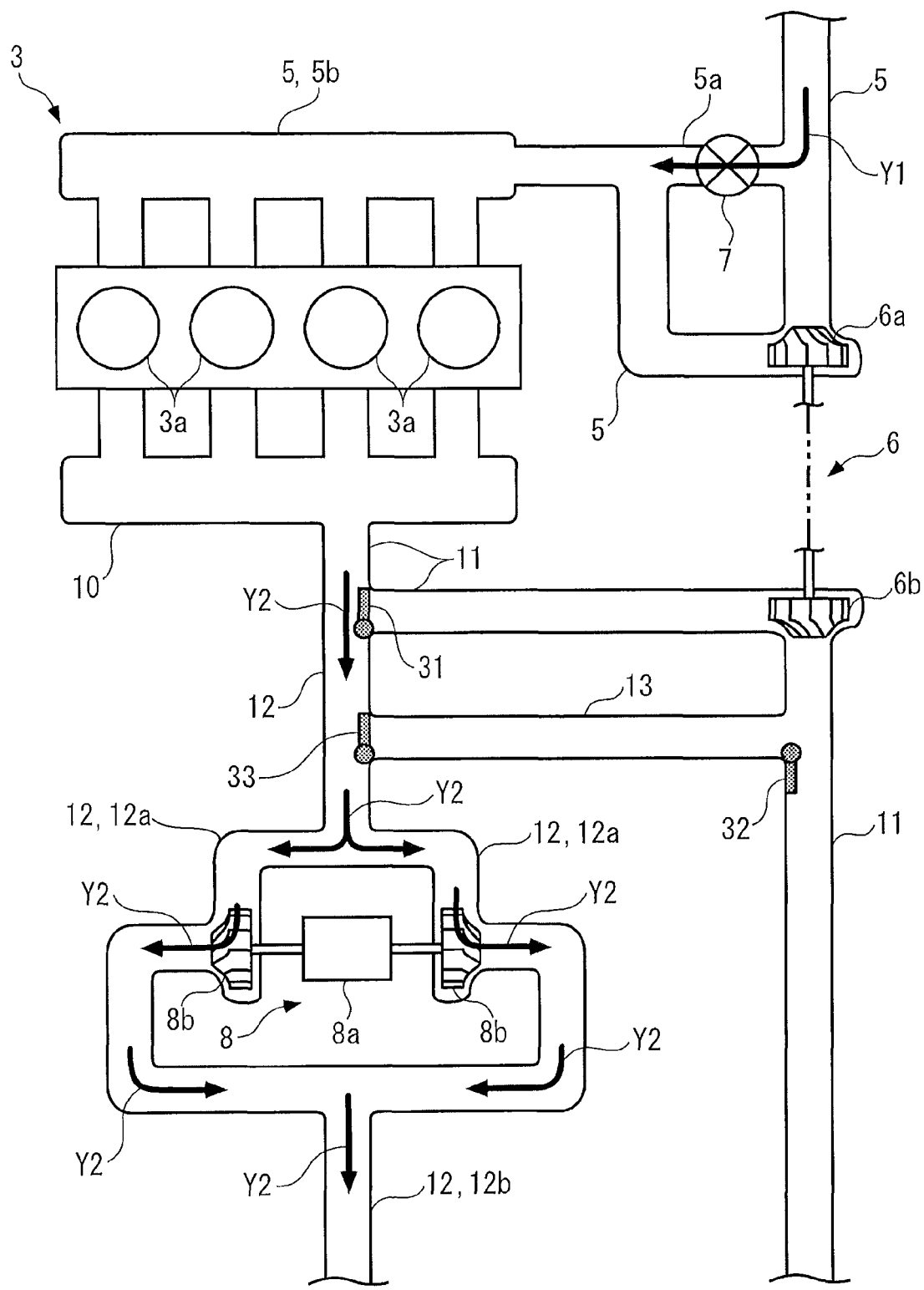
FIG. 8 illustrates the flows of intake air and exhaust gas during execution of an NA regenerative operation control process.

Also, as shown in FIG. 8, the first passage switching valve 31 is controlled to the non-supercharging position, and the third passage switching valve 33 is controlled to the non-communicating position. This causes the exhaust gas discharged into the exhaust manifold 10 from the cylinders 3a to flow as indicated by arrow Y2 in FIG. 8. That is, the exhaust gas flows into the main exhaust passage 11 from the exhaust manifold 10 and then flows only to the auxiliary exhaust passage 12 side. After entering the auxiliary exhaust passage 12, the exhaust gas divides into the branch passage portions 12a, 12a, passes through the power turbines 8b, 8b, and then merges and flows down the merging passage portion 12b.

Further, regenerative control on the turbine motor 8a of the power turbine device 8 is executed in accordance with the operation area parameters. As described above, during execution of the NA regenerative operation control process, regenerative control on the turbine motor 8a is executed with supercharging by the turbo charger device 6 stopped. The NA regenerative operation control process is accordingly executed when surplus exhaust energy is generated in execution natural aspiration operation of the engine 3, such as during high speed navigation with low load operation.

After the NA regenerative operation control process is executed at step 10 as described above, the control flow ends.

As described above, in the supercharging control process in FIG. 3, the controller 1 in the first embodiment executes the NA operation control process in step 3 when the determination at step 2 results in YES, which means the operation area parameters fall in the predetermined NA operation area, that is, the operation area of the engine 3 falls in the predetermined NA operation area. In the NA operation control process, the first passage switching valve 31 is controlled so that exhaust gas from the exhaust manifold 10 flows only to the auxiliary exhaust passage 12 side without flowing to the main exhaust passage 11 on the upstream side of the supercharging turbine 6b, the third passage switching valve 33 is controlled so that exhaust gas flows only to the communicating passage 13 side without flowing to the auxiliary exhaust passage 12 on the power turbine 8b side, and the second passage switching valve 32 is controlled so that exhaust gas flows from the communicating passage 13 to the main exhaust passage 11 on the downstream side of the point of connection with the communicating passage 13.

In this way, when the operation area of the engine 3 falls in the predetermined NA operation area, exhaust gas from the exhaust manifold 10 can be made to flow down the auxiliary exhaust passage 12, the communicating passage 13, and the main exhaust passage 11 in this order by not allowing it to pass through either the supercharging turbine 6b or the power turbines 8b. Consequently, when the operation area parameters are within the predetermined NA operation area, the exhaust resistance can be reduced compared to Japanese Patent No. 4892054, in which exhaust gas from the exhaust manifold passes through the power turbine in the bypass passage. Additionally, because exhaust gas flows in a single channel without either branching or merging, interference of exhaust gas arising from merging can be avoided and the exhaust resistance can be further decreased, as opposed to Japanese Patent No. 4892054, which involves merging of exhaust gas split in two flows. As a result, the exhaust efficiency can be improved, leading to improved fuel economy and market appeal.

When the determination at step 8 results in YES, which means the operation area parameters fall in a predetermined parallel operation area, that is, when the operation area of the engine 3 falls in the predetermined parallel operation area, then a parallel operation control process is executed in step 9. In the parallel operation control process, the first passage switching valve 31 is controlled so that exhaust gas from the exhaust manifold 10 flows to the main exhaust passage 11 on the upstream side of the supercharging turbine 6b and to the auxiliary exhaust passage 12 side from the point of connection of the auxiliary exhaust passage 12 and the main exhaust passage 11, the second passage switching valve 32 is controlled so that the exhaust gas having passed through the supercharging turbine 6b flows into the main exhaust passage 11 without flowing to the communicating passage 13, and the third passage switching valve 33 is controlled so that the exhaust gas having flowed into the auxiliary exhaust passage 12 from the main exhaust passage 11 flows to the power turbine 8b side without flowing in the communicating passage 13.

In this way, when the operation area of the engine 3 falls in a predetermined parallel operation area, exhaust gas from the exhaust manifold 10 can be made to flow to both the supercharging turbine 6b side and the power turbine 8b side, and after passing through the supercharging turbine 6b, flow down the main exhaust passage 11. At the same time, exhaust gas which has passed through the power turbines 8b can be guided into the auxiliary exhaust passage 12. That is, by allowing exhaust gas from the two turbines to flow down without being merged, the heat drop available in the two turbines can be increased so that the works of the turbines can be improved, as compared to Japanese Patent No.

4892054, in which flows of exhaust gas from two passages merge. As a result, the fuel economy is improved.

While the auxiliary exhaust passage 12 in the first embodiment is described as being constructed to branch into two branch passage portions 12a, 12a which subsequently merge into the merging passage portion 12b downstream of the power turbines 8b, 8b, the two branch passage portions 12a, 12a may alternatively be structured to continue to extend as two passage portions without merging downstream of the power turbines 8b, 8b. In such an arrangement, the exhaust resistance in the auxiliary exhaust passage 12 can be further decreased, which in turn can further improve the power generation efficiency and the like of the power turbine device 8.

Next, referring to FIG. 9, an engine 3A and a controller 1A for the same in a second embodiment of the present disclosure will be described. As the engine 3A has the same configuration as the engine 3 of the first embodiment except several portions, the same features as ones of the engine 3 are denoted with the same reference characters and not described again; only the differences will be discussed. In the controller 1A, although not depicted, the electrical configurations of the ECU 2 and other components are the same as the controller 1 described above.

Figure 9:
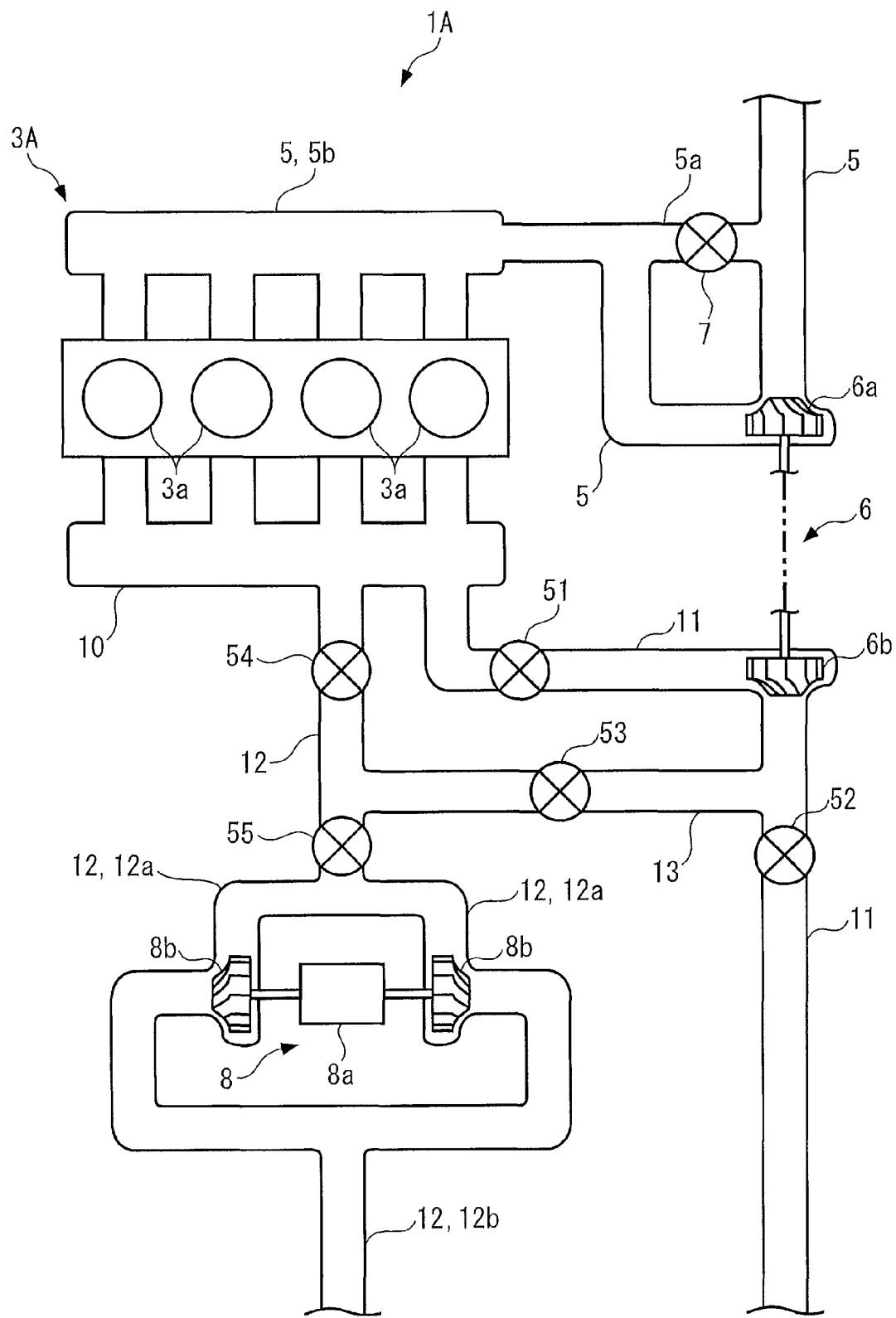
FIG. 9 schematically shows the configuration of an internal combustion engine and a controller for the internal combustion engine according to a second embodiment.

As shown in FIG. 9, in the engine 3A, the auxiliary exhaust passage 12 extends from the exhaust manifold 10 separately from the main exhaust passage 11, and five or first to fifth passage valves 51 to 55 are provided in place of the three passage switching valves 31 to 33.

The first passage valve 51 is positioned in the main exhaust passage 11 upstream of the supercharging turbine 6b, and the second passage valve 52 is positioned in the main exhaust passage 11 downstream of the point of connection with the communicating passage 13.

The third passage valve 53 is positioned at some midpoint of the communicating passage 13, and the fourth passage valve 54 is positioned in the auxiliary exhaust passage 12 upstream of the point of connection with the communicating passage 13. The fifth passage valve 55 is positioned in the auxiliary exhaust passage 12 between the point of connection with the communicating passage 13 and the point at which the auxiliary exhaust passage 12 branches into the two branch passage portions 12a, 12a.

The first to fifth passage valves 51 to 55 are each structured similarly to the CBV 7 above. They are electrically connected with the ECU 2 (not shown) and controlled between the fully closed state and the fully open state by a control input signal from the ECU 2 so as to open and close the passages in which they are located.

In this embodiment, the ECU 2 corresponds to the NA operation area determination unit, the NA operation control unit, the parallel operation area determination unit, and the parallel operation control unit, the first and fourth passage valves 51, 54 correspond to the first switching element, the second and third passage valves 52, 53 correspond to the second switching element, and the third and fifth passage valves 53, 55 correspond to the third switching element.

The controller 1A of the engine 3A thus arranged executes the supercharging control process in a similar manner to FIG. 3 described earlier. In the process, the turbo charger device 6, the CBV 7, and the power turbine device 8 are controlled in the same manner as FIG. 3, and the first to fifth passage valves 51 to 55 are controlled between the fully open state and the fully closed state so that the exhaust gas flows in the same directions as FIGS. 4 to 8 described above. As a result, similar operational effects to those of the controller 1 in the first embodiment can be achieved.

While the auxiliary exhaust passage 12 in the engine 3A in the second embodiment has been described as extending from the exhaust manifold 10 separately from the main exhaust passage 11, the auxiliary exhaust passage 12 may alternatively branch off at a certain point of the main exhaust passage 11 like the engine 3 in the first embodiment. In such an arrangement, the first passage valve 51 may be disposed in the main exhaust passage 11 downstream of the point where the auxiliary exhaust passage 12 branches off, and the fourth passage valve 54 may be disposed in the auxiliary exhaust passage 12 downstream of the point where the auxiliary exhaust passage 12 branches off from the main exhaust passage 11.

Figure 10:
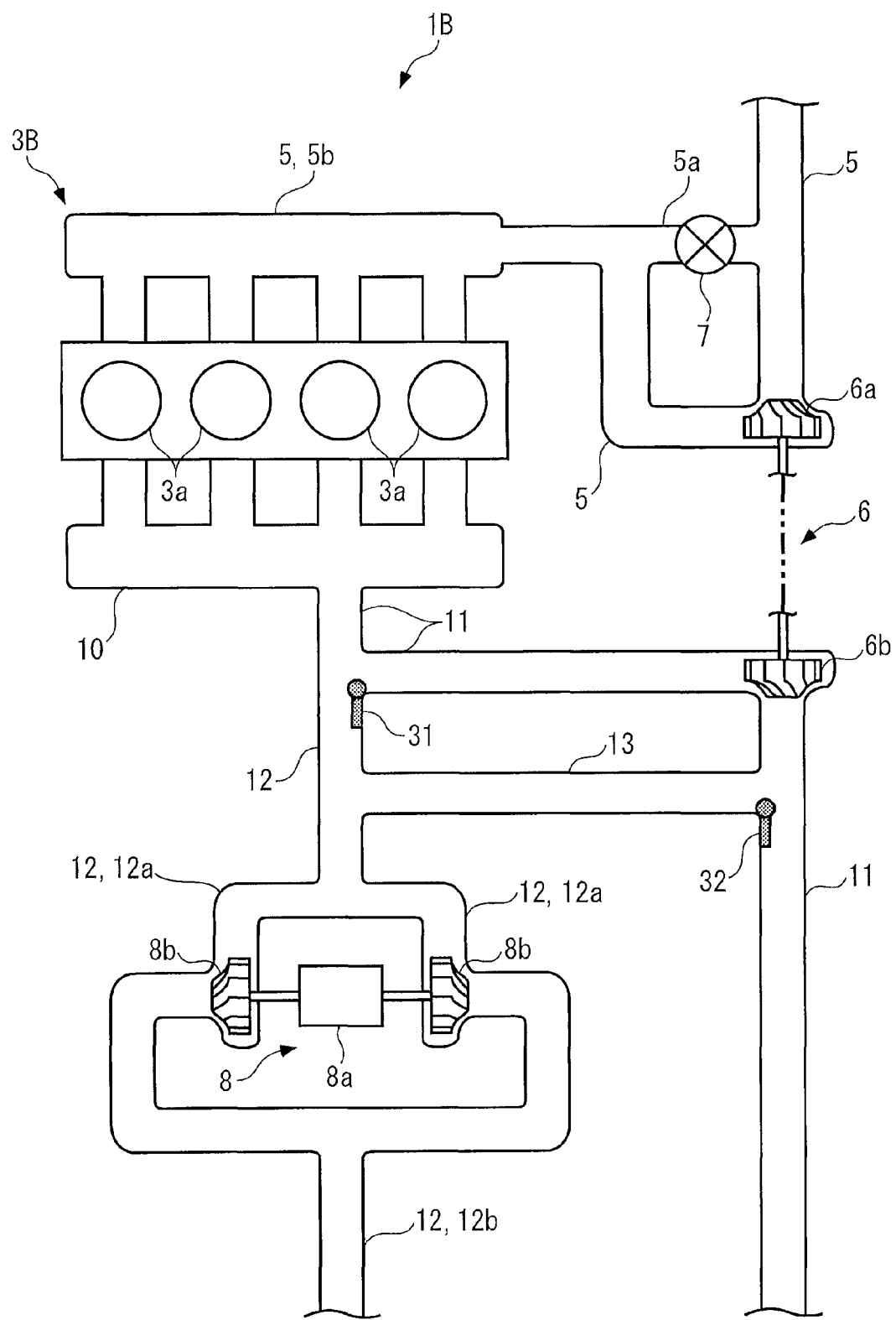
FIG. 10 schematically shows the configuration of an internal combustion engine and a controller for the internal combustion engine according to a third embodiment.

Next, referring to FIG. 10, an engine 3B and a controller 1B for the same in a third embodiment of the present disclosure will be described. As will be apparent from comparison of FIG. 10 with FIG. 1, the arrangement of the engine 3B is equivalent to that of the engine 3 in the first embodiment but the third passage switching valve 33 omitted. In the controller 1B, although not depicted, the electrical configurations of the ECU 2 and other components are the same as the controller 1 described above.

In this embodiment, the ECU 2 corresponds to the NA operation area determination unit, the NA operation control unit, the parallel operation area determination unit, and the parallel operation control unit, the first passage switching valve 31 corresponds to the first switching element, and the second passage switching valve 32 corresponds to the second switching element.

The controller 1B of the engine 3B thus arranged executes the supercharging control process in a similar manner to FIG. 3 described earlier. In the process, the turbo charger device 6, the CBV 7, the power turbine device 8, and the two passage switching valves 31, 32 are controlled in the same manner as FIG. 3, in response to which exhaust gas flows as shown in FIGS. 11 to 15.

Figure 11:
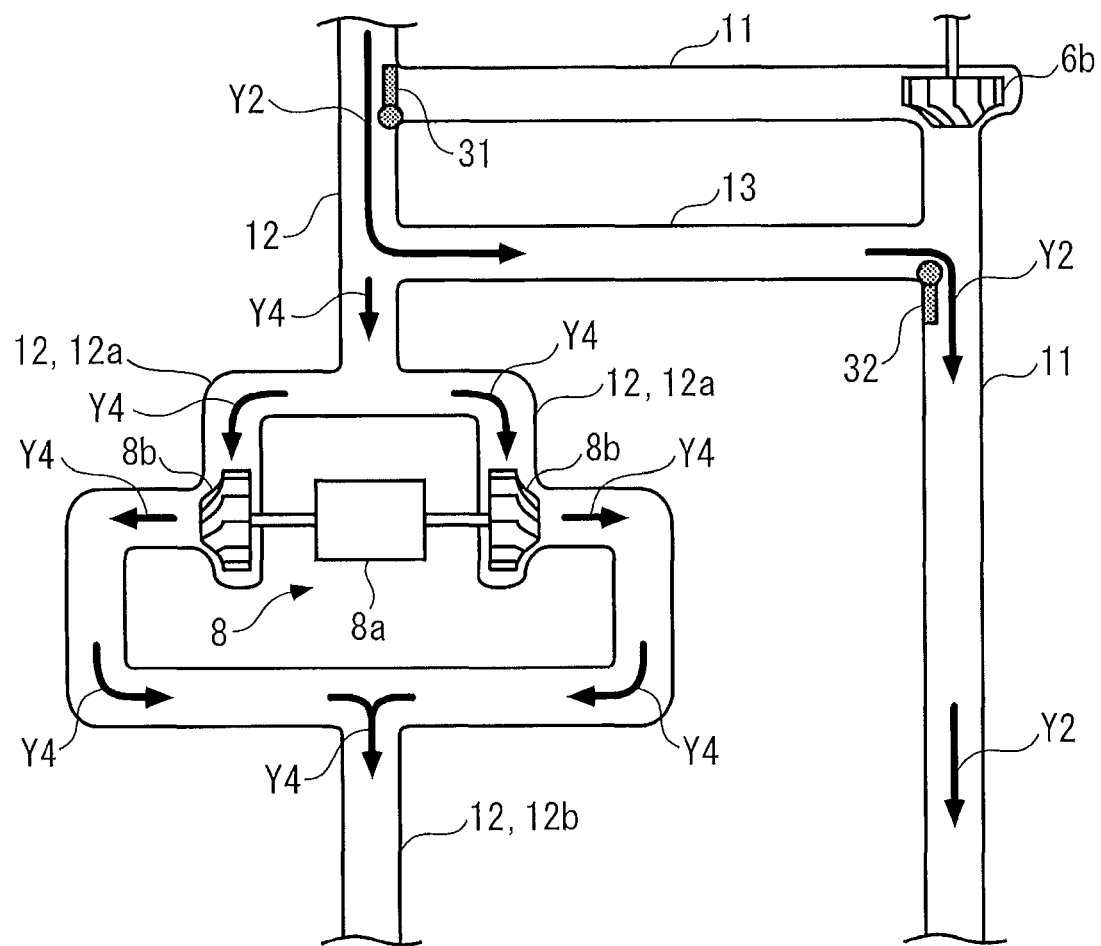
FIG. 11 illustrates the flow of exhaust gas during execution of an NA operation control process in the third embodiment.
Figure 12:
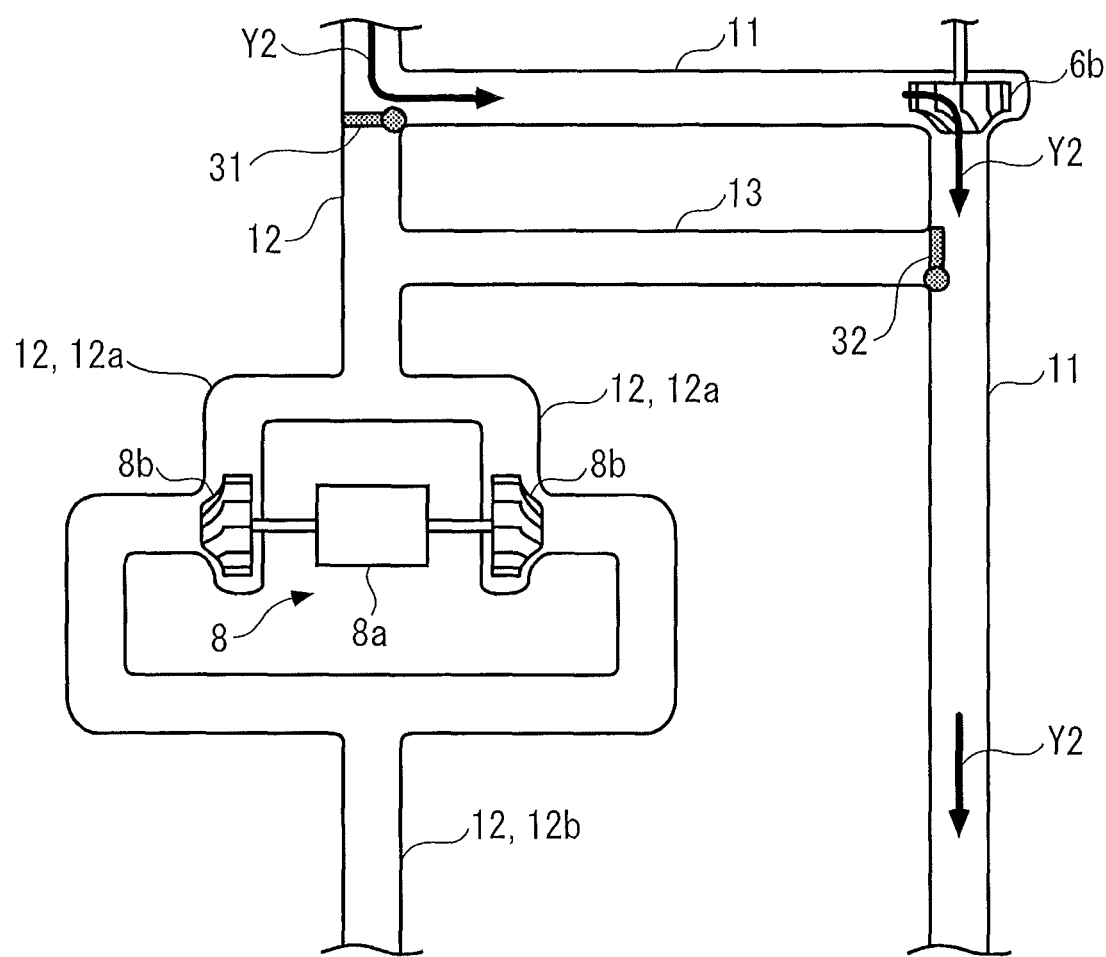
FIG. 12 illustrates the flow of exhaust gas during execution of a supercharging operation control process in the third embodiment.
Figure 13:
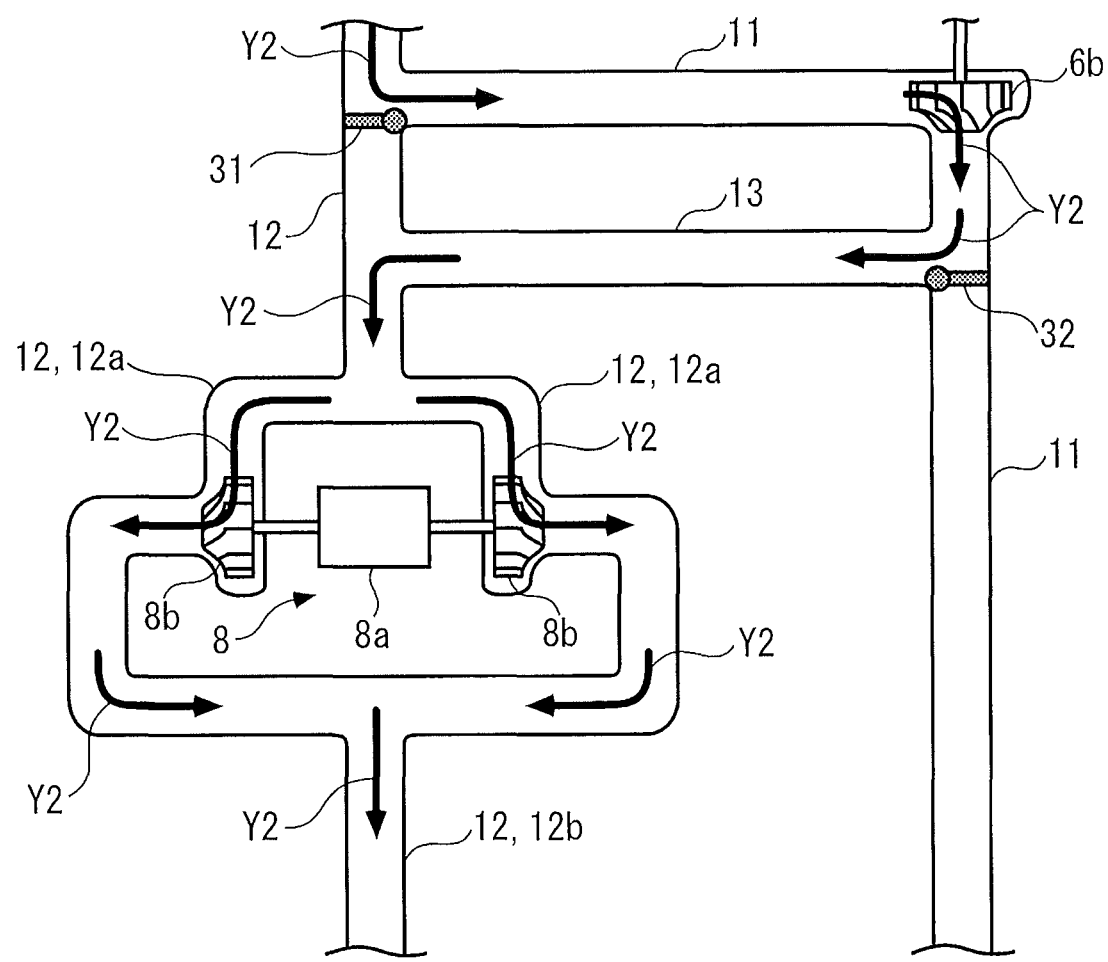
FIG. 13 illustrates the flow of exhaust gas during execution of a serial operation control process in the third embodiment.
Figure 14:
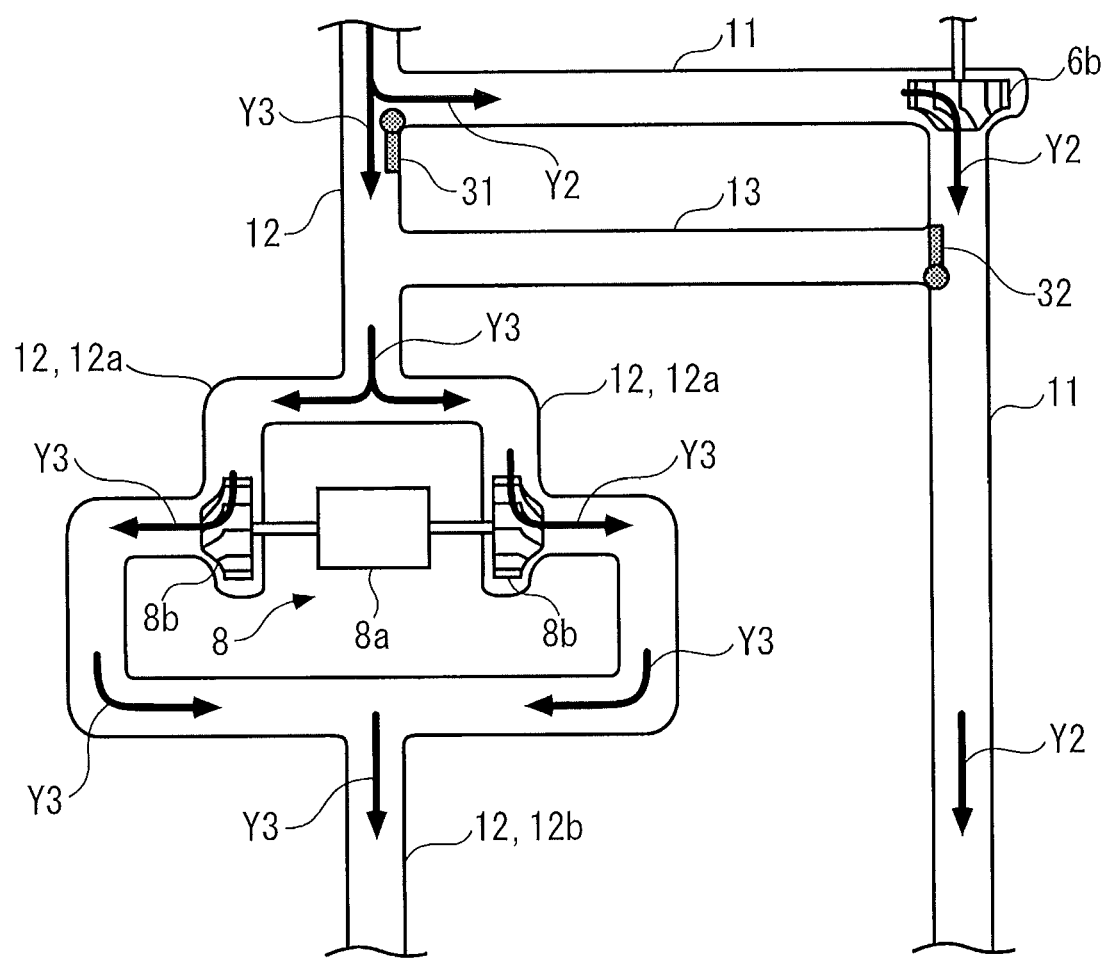
FIG. 14 illustrates the flow of exhaust gas during execution of a parallel operation control process in the third embodiment.
Figure 15:
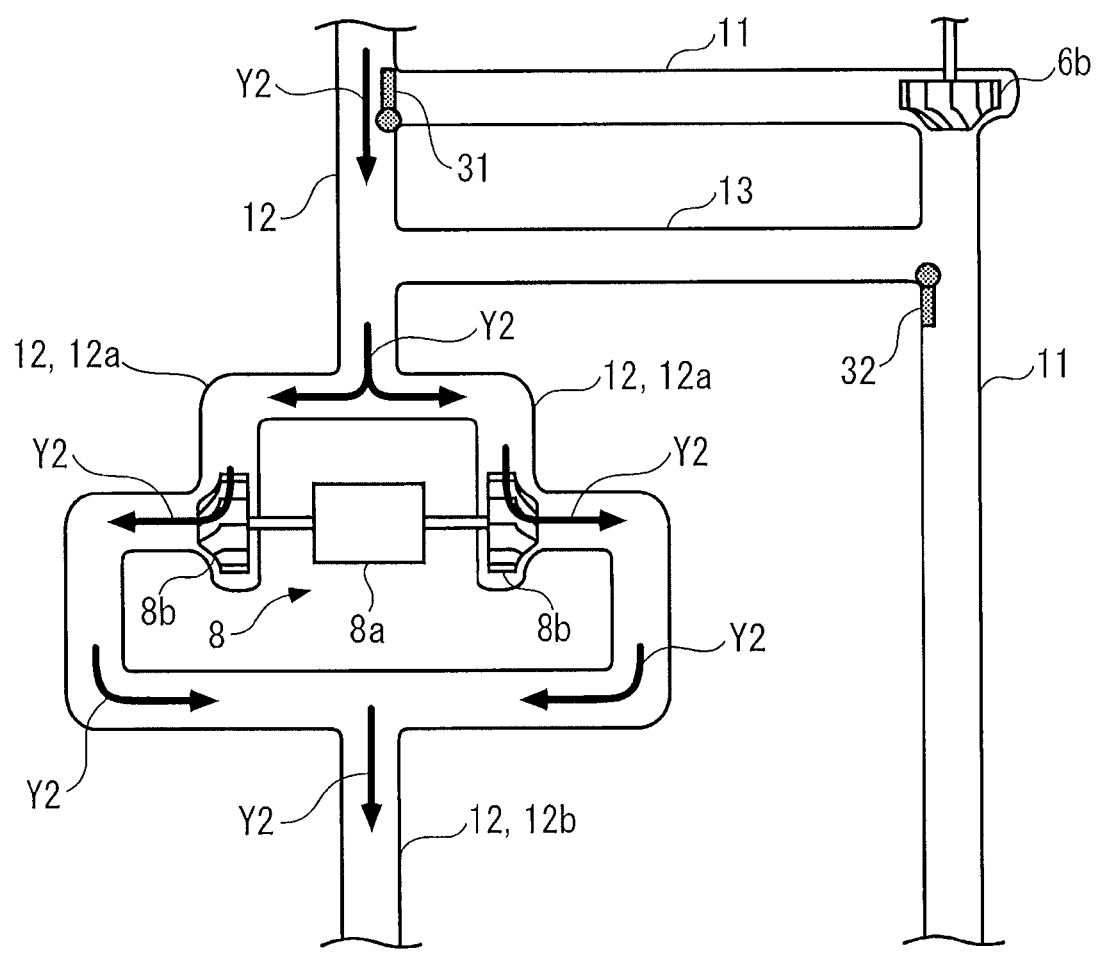
FIG. 15 illustrates the flow of exhaust gas during execution of an NA regenerative operation control process in the third embodiment.

As will be apparent from comparison of FIGS. 11 to 15 with FIGS. 4 to 8 showing the first embodiment, the flow of exhaust gas shown in FIGS. 12 to 15 is the same as FIGS. 5 to 8 and only the flow of exhaust gas when the NA operation control process shown in FIG. 11 is executed is different from FIG. 4. Thus, only the contents of FIG. 11 will be described.

As shown in FIG. 11, while the NA operation control process is executed, the first passage switching valve 31 is controlled to the non-supercharging position and the second passage switching valve 32 is controlled to the origin position. This causes most part of the exhaust gas discharged to the exhaust manifold 10 from the cylinders 3a to flow as indicated by arrow Y2 in FIG. 11, and the remaining small amount of exhaust gas to flow as indicated by arrow Y4 in FIG. 11.

That is, most part of the exhaust gas flows from the exhaust manifold 10 into the main exhaust passage 11, the auxiliary exhaust passage 12, and the communicating passage 13 in this order and then re-enters the main exhaust passage 11 from the communicating passage 13 as indicated by arrow Y2. Meanwhile, the remaining small amount of exhaust gas flows into the auxiliary exhaust passage 12 and then divides into the branch passage portions 12a, 12a as indicated by arrow Y4. After passing through the power turbines 8b, 8b, the two flows of exhaust gas merge and flow down the merging passage portion 12b.

As described above, during the NA operation control process with the controller 1B of this embodiment, most part of exhaust gas bypasses the supercharging turbine 6b and flows to the main exhaust passage 11 while the remaining small amount of exhaust gas flows passing through the power turbines 8b, 8b in the auxiliary exhaust passage 12. Since the auxiliary exhaust passage 12 extends separately from the main exhaust passage 11 in the engine 3B, interference between exhaust gas flows arising from merging can be avoided and the exhaust resistance can be correspondingly decreased during execution of NA operation, unlike Japanese Patent No. 4892054, in which the flows of exhaust gas from two passages merge. As a result, the exhaust efficiency can be improved, leading to improved fuel economy and market appeal.

In addition, when the operation area of the engine 3 falls in a predetermined parallel operation area, the exhaust gas flows in a similar manner to the case of controller 1 in the first embodiment; similar operational effects to those of the controller 1 in the first embodiment can be achieved.

Figure 16:
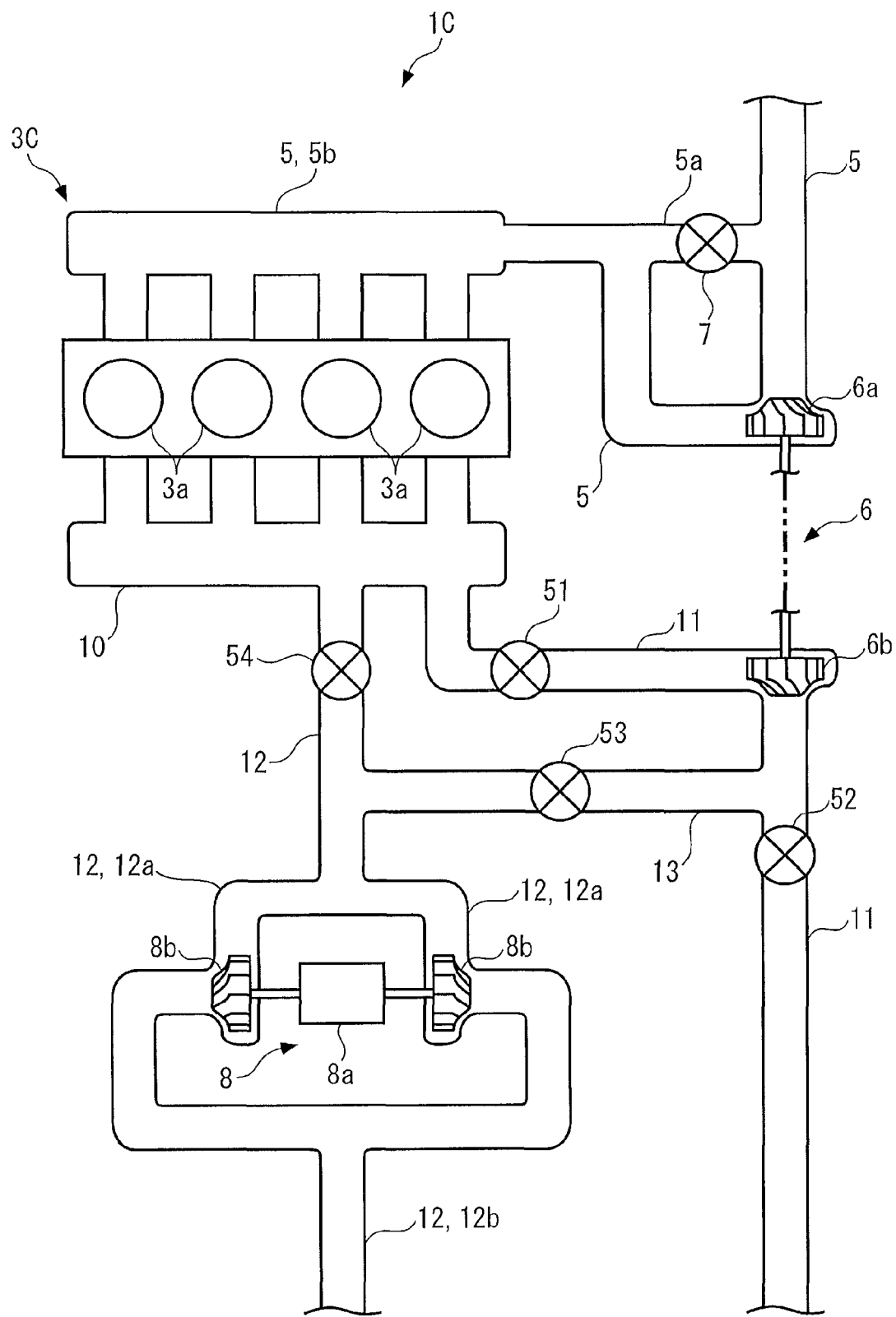
FIG. 16 schematically shows the configuration of an internal combustion engine and a controller for the internal combustion engine according to a fourth embodiment.

Next, referring to FIG. 16, an engine 3C and a controller 1C for the same in a fourth embodiment of the present disclosure will be described. As will be apparent from comparison of FIG. 16 with FIG. 9, the arrangement of the engine 3C is equivalent to that of the engine 3A in the second embodiment but the fifth passage valve 55 omitted. In the controller 1C, although not depicted, the electrical configurations of the ECU 2 and other components are the same as the controller 1 described above.

In this embodiment, the ECU 2 corresponds to the NA operation area determination unit, the NA operation control unit, the parallel operation area determination unit, and the parallel operation control unit, the first and fourth passage valves 51, 54 correspond to the first switching element, and the second and third passage valves 52, 53 correspond to the second switching element.

The controller 1C of the engine 3C thus arranged executes the supercharging control process in a similar manner to FIG. 3 described earlier. In the process, the turbo charger device 6, the CBV 7, and the power turbine device 8 are controlled in the same manner as FIG. 3, and the first to fourth passage valves 51 to 54 are individually controlled between the fully open state and the fully closed state so that the exhaust gas flows in the same directions as FIGS. 11 to 15. As a result, similar operational effects to those of the controller 1B in the third embodiment can be achieved.

While the internal combustion engine shown in the forgoing embodiments is of a diesel engine type, the internal combustion engine according to the present disclosure may alternatively be an internal combustion engine that runs on gasoline or blended fuel, and the controller of the present disclosure is also applicable to such an internal combustion engine.

While the foregoing embodiments describe the internal combustion engine according to the present disclosure as applied to an internal combustion engine for a vehicle, the internal combustion engine of the present disclosure is also applicable to internal combustion engines for ships or other industrial machines and the controller of the present disclosure is also applicable to such internal combustion engines.

Further, while the foregoing embodiments describe the controller according to the present disclosure as applied to an internal combustion engine of a vehicle powered only by the internal combustion engine, the controller according to the present disclosure may alternatively be applied to an internal combustion engine for a hybrid vehicle which is powered by an internal combustion engine and an electric motor. In that case, the following operational effects would be achieved.

A typical hybrid vehicle can hardly execute power regeneration with an electric motor under driving conditions in which deceleration does not occur frequently, such as during high-speed navigation. As a result of little driving energy being recovered, it is impossible to improve the energy efficiency of the entire vehicle. In contrast, the controller according to the present disclosure is able to execute power regeneration with the rotary machine of the power turbine device even under driving conditions with infrequent deceleration, such as during high-speed navigation. Thus, it can improve the energy efficiency of the entire vehicle and also increase both the fuel economy and the market appeal.

In addition, while the embodiments above use a turbine motor 8a of a DC motor type as the rotary machine, the rotary machine of the present disclosure may be any rotary machine that is capable of regenerative control and powering control. For example, an AC motor or a brushless DC motor may be employed as the rotary machine.

In addition, while the first embodiment uses the first to third passage switching valves 31 to 33 and the second embodiment uses the first to fifth passage valves 51 to 55 as the first to fifth switching devices, the first to fifth switching devices of the present disclosure may alternatively be any mechanism that can be switched between a state in which it allows exhaust gas to flow in (or pass through it) and a state in which it prevents exhaust gas from flowing in (or passing through it).

An internal combustion engine 3, 3A to 3C in a first aspect of the present disclosure includes: an exhaust manifold 10; a main exhaust passage 11 into which exhaust gas from the exhaust manifold 10 flows; an auxiliary exhaust passage 12 which is formed separately from the main exhaust passage 11 such that exhaust gas from the exhaust manifold 10 flows in; a turbo charger device 6 which includes a supercharging turbine 6b disposed at some midpoint of the main exhaust passage 11; a power turbine device 8 which includes power turbines 8b disposed at some midpoint of the auxiliary exhaust passage 12 and a rotary machine (a turbine motor 8a) coupled to the power turbines 8b; a communicating passage 13 one end of which is connected with the main exhaust passage 11 at a point downstream of the supercharging turbine 6b and another end of which is connected with the auxiliary exhaust passage 12 at a point upstream of the power turbines 8b, and which communicates with the main exhaust passage 11 and the auxiliary exhaust passage 12; a first switching element (a first passage switching valve 31, first and fourth passage valves 51, 54) configured to switch a communication state of the exhaust manifold 10 between a state in which the exhaust manifold 10 communicates only with a main exhaust passage 11 side, a state in which the exhaust manifold 10 communicates only with an auxiliary exhaust passage 12 side, and a state in which the exhaust manifold 10 communicates with both the main exhaust passage 11 side and the auxiliary exhaust passage 12 side; and a second switching element (a second passage switching valve 32, second and third passage valves 52, 53) configured to switch the communication state of the communicating passage 13 with the main exhaust passage 11 between a state in which the communicating passage 13 communicates with the main exhaust passage 11 only on an upstream side of a point of connection with the communicating passage 13, a state in which the communicating passage 13 communicates with the main exhaust passage 11 on both upstream and downstream sides of the point of connection with the communicating passage 13, and a state in which the communicating passage 13 does not communicate with the main exhaust passage 11.

In this internal combustion engine, the communication state of the exhaust manifold can be switched by the first switching element between a state in which the exhaust manifold communicates only with the main exhaust passage side, a state in which the exhaust manifold communicates only with the auxiliary exhaust passage side, and a state in which the exhaust manifold communicates with both the main exhaust passage side and the auxiliary exhaust passage side. Also, the communication state of the communicating passage with the main exhaust passage can be switched by the second switching element between a state in which the communicating passage communicates with the main exhaust passage only on the upstream side of the point of connection with the communicating passage, a state in which the communicating passage communicates with the main exhaust passage on both the upstream and downstream sides of the point of connection with the communicating passage, and a state in which the communicating passage does not communicate with the main exhaust passage.

Accordingly, when the internal combustion engine is in an operation area which requires supercharging action by the turbo charger device and regenerative control or powering control on the power turbine device, for example, the first switching element is switched into a state in which the exhaust manifold communicates with both the main exhaust passage side and the auxiliary exhaust passage side, while the second switching element is switched into a state in which the communicating passage does not communicate with the main exhaust passage. The exhaust gas from the exhaust manifold is thereby guided into both the supercharging turbine side and the power turbine side. Then, the exhaust gas that has passed through the supercharging turbine is made to flow into the main exhaust passage, while the exhaust gas that has passed through the power turbines is made to flow into the auxiliary exhaust passage. Because the auxiliary exhaust passage is separate from the main exhaust passage and the exhaust gas flowing in the auxiliary exhaust passage and the exhaust gas flowing in the main exhaust passage do not merge with each other, the heat drop available in the two turbines can be increased and the works of the two turbines can be improved, as compared to an internal combustion engine in which flows of exhaust gas from two passages merge, such as Japanese Patent No. 4892054. As a result, the fuel economy and the market appeal can be improved.

When the internal combustion engine is in an NA operation area, for example, the first switching element is switched into a state in which the exhaust manifold communicates only with the auxiliary exhaust passage side, while the second switching element is switched into a state in which the communicating passage communicates with the main exhaust passage on both the upstream and downstream sides of the point of connection with the communicating passage. This makes most part of the exhaust gas from the exhaust manifold flow into the auxiliary exhaust passage without passing through the supercharging turbine of the turbo charger device, and then flow from the communicating passage into the main exhaust passage. At the same time, the remaining small amount of exhaust gas is made to flow into the auxiliary exhaust passage, pass through the power turbines, and then flow into the auxiliary exhaust passage. Because the exhaust gas flowing in the auxiliary exhaust passage and the exhaust gas flowing in the main exhaust passage do not merge with each other as mentioned above, interference between exhaust gas flows arising from merging can be avoided and the exhaust resistance can be correspondingly decreased, unlike Japanese Patent No. 4892054, in which flows of exhaust gas from two passages merge. As a result, the fuel economy and the market appeal can be improved.

According to a second aspect of the present disclosure, in the internal combustion engine 3, 3B according to the first aspect, the auxiliary exhaust passage 12 may extend branching off from the main exhaust passage 11 at a point upstream of the supercharging turbine 6b, the first switching element may include a first passage switching valve 31 disposed near a point where the auxiliary exhaust passage 12 branches off from the main exhaust passage 11, and the second switching element may include a second passage switching valve 32 disposed near the point of connection of the main exhaust passage 11 and the communicating passage 13.

In this internal combustion engine, the two switching elements can be implemented with relatively simple mechanisms, that is, two passage switching valves disposed near the points of connection and branching of the two passages. Thus, manufacturing cost can be decreased.

According to a third aspect of the present disclosure, the internal combustion engine 3, 3A according to the first or second aspect may further include a third switching element (a third passage switching valve 33, third and fifth passage valves 53, 55) configured to switch the communication state of the communicating passage 13 with the auxiliary exhaust passage 12 between a state in which the communicating passage 13 communicates with the auxiliary exhaust passage 12 only on the upstream side of the point of connection with the communicating passage 13, a state in which the communicating passage 13 communicates with the auxiliary exhaust passage 12 on both upstream and downstream sides of the point of connection with the communicating passage 13, and a state in which the communicating passage 13 does not communicate with the auxiliary exhaust passage 12.

With this internal combustion engine, when the internal combustion engine is in the NA operation area, for example, the first switching element is switched into a state in which the exhaust manifold communicates only with the auxiliary exhaust passage side, the second switching element is switched into a state in which the communicating passage communicates with the main exhaust passage on both the upstream and downstream sides of the point of connection with the communicating passage, and the third switching element is switched into a state in which the communicating passage communicates with the auxiliary exhaust passage only on the upstream side of the point of connection with the communicating passage. This causes exhaust gas from the exhaust manifold to flow down the auxiliary exhaust passage, communicating passage, and the main exhaust passage in this order by not allowing it to pass through either the supercharging turbine or the power turbines. As a result, the exhaust resistance can be further reduced compared to the internal combustion engine according to the first or second aspect, enabling further improvement of both the fuel economy and market appeal.

According to a fourth aspect of the present disclosure, in the internal combustion engine 3 according to the third aspect, the third switching element may include a third passage switching valve 33 disposed near the point of connection of the auxiliary exhaust passage 12 and the communicating passage 13.

With this internal combustion engine, the third switching element can be implemented with a relatively simple mechanism, that is, a single passage switching valve disposed near the point of connection of two passages. Thus, manufacturing cost can be further decreased.

According to a fifth aspect of the present disclosure, in the internal combustion engine 3, 3A to 3C according to one of the first to fourth aspects, the power turbine device 8 may include a pair of power turbines 8b, 8b concentrically arranged on a single rotating shaft as the power turbines 8b, and the power turbine device 8 may be constructed such that two flows of exhaust gas that have passed through the pair of power turbines 8b, 8b are discharged in opposite directions to each other along an axis of rotation.

In this internal combustion engine, the power turbine device includes a pair of power turbines concentrically arranged on a single rotating shaft as the power turbines, and the two flows of exhaust gas having passed through the pair of power turbines are discharged in opposite directions to each other along the axis of rotation. Thus, when the power turbines rotate by being driven by the exhaust gas flowing in the auxiliary exhaust passage, the thrust power generated in one of the two power turbines acts toward the thrust power generated in the other power turbine, resulting in mutual cancellation of the thrust power. Thus, unlike a power turbine device having only one power turbine, such as Japanese Patent No. 4892054, increase in rotational resistance associated with thrust power generated by rotation of the pair of power turbines, if any, can be avoided, enabling higher energy efficiency.

According to a sixth aspect of the present disclosure, a controller 1, 1A to 1C for the internal combustion engine 3, 3A to 3C of the first aspect includes: an NA operation area determination unit (ECU 2, step 2) which determines whether an operation area of the internal combustion engine 3, 3A to 3C falls in a predetermined NA operation area in which supercharging action by the turbo charger device 6 is to be stopped; and an NA operation control unit (ECU 2, step 3) which, when the NA operation area determination unit determines that the operation area of the internal combustion engine 3, 3A to 3C falls in the predetermined NA operation area (when the determination in step 2 results in YES), controls the first switching element (the first passage switching valve 31, the first and fourth passage valves 51, 54) into a state in which the exhaust manifold 10 communicates only with the auxiliary exhaust passage 12 side, and controls the second switching element (the second passage switching valve 32, second and third passage valves 52, 53) into a state in which the communicating passage 13 communicates with the main exhaust passage 11 on both upstream and downstream sides of the point of connection with the communicating passage 13.

This controller for an internal combustion engine determines whether the operation area of the internal combustion engine falls in a predetermined NA operation area in which supercharging action by the turbo charger device is to be stopped. When the operation area of the internal combustion engine is determined to be in the predetermined NA operation area, the first switching element is controlled so as to make the exhaust manifold communicate only with the auxiliary exhaust passage side and the second switching element is controlled so as to make the communicating passage communicate with the main exhaust passage on both upstream and downstream sides of the point of connection with the communicating passage. By doing so, when the internal combustion engine is in the predetermined NA operation area, most part of the exhaust gas from the exhaust manifold is made to flow into the auxiliary exhaust passage without passing through the supercharging turbine, and then flow from the communicating passage into the main exhaust passage. At the same time, the remaining small amount of exhaust gas is made to flow from the communicating passage through the power turbines in the auxiliary exhaust passage, and then further flow down the auxiliary exhaust passage. Because the exhaust gas flowing in the auxiliary exhaust passage and the exhaust gas flowing in the main exhaust passage do not merge with each other as mentioned above, interference between exhaust gas flows arising from merging can be avoided and the exhaust resistance can be correspondingly decreased, unlike Japanese Patent No. 4892054, in which the flows of exhaust gas from two passages merge. As a result, the fuel economy and market appeal can be improved when the operation area of the internal combustion engine is in the predetermined NA operation area.

According to a seventh aspect of the present disclosure, a controller 1, 1A to 1C for the internal combustion engine 3, 3A to 3C of the first aspect includes: a parallel operation area determination unit (ECU 2, step 8) which determines whether an operation area of the internal combustion engine 3, 3A to 3C falls in a predetermined parallel operation area in which supercharging action by the turbo charger device 6 and regenerative control on the rotary machine (turbine motor 8a) are to be effected; and a parallel operation control unit (ECU 2, step 9) which, when the parallel operation area determination unit determines that the operation area of the internal combustion engine 3, 3A to 3C falls in the predetermined parallel operation area (when the determination in step 8 results in YES), controls the first switching element into a state in which the exhaust manifold 10 communicates with both the main exhaust passage 11 side and the auxiliary exhaust passage 12 side, and controls the second switching element (the second passage switching valve 32, the second and third passage valves 52, 53) into a state in which the communicating passage 13 does not communicate with the main exhaust passage 11.

This controller for the internal combustion engine determines whether the operation area of the internal combustion engine falls in a predetermined parallel operation area in which supercharging action by the turbo charger device and regenerative control on the rotary machine are to be effected. When the operation area of the internal combustion engine is determined to be in the predetermined parallel operation area, the first switching element is controlled so as to make the exhaust manifold communicate with both the main exhaust passage side and the auxiliary exhaust passage side, and the second switching element is controlled so as to make the communicating passage not communicate with the main exhaust passage. By doing so, when the internal combustion engine is in the predetermined parallel operation area, the exhaust gas from the exhaust manifold is made to flow into both the supercharging turbine side and the power turbine side. Then, the exhaust gas that has passed through the supercharging turbine is made to flow into the main exhaust passage, while the exhaust gas that has passed through the power turbines is made to flow into the auxiliary exhaust passage. Because the exhaust gas flowing in the auxiliary exhaust passage and the exhaust gas flowing in the main exhaust passage do not merge with each other as mentioned above, the heat drop available in the two turbines can be increased and the works of the two turbines can be improved, as compared to an internal combustion engine in which the flows of exhaust gas from two passages merge, such as Japanese Patent No. 4892054. As a result, the fuel economy and market appeal can be improved when the operation area of the internal combustion engine is in the predetermined parallel operation area.

According to an eighth aspect of the present disclosure, a controller 1, 1A for the internal combustion engine 3, 3A of the third aspect includes: an NA operation area determination unit (ECU 2, step 2) which determines whether an operation area of the internal combustion engine 3, 3A falls in a predetermined NA operation area in which supercharging action by the turbo charger device 6 is to be stopped; and an NA operation control unit (ECU 2, step 3) which, when the NA operation area determination unit determines that the operation area of the internal combustion engine 3, 3A falls in the predetermined NA operation area (when the determination in step 2 results in YES), controls the first switching element (the first passage switching valve 31, the first and fourth passage valves 51, 54) into a state in which the exhaust manifold 10 communicates only with the auxiliary exhaust passage 12 side, controls the second switching element (the second passage switching valve 32, the second and third passage valves 52, 53) into a state in which the communicating passage 13 communicates with the main exhaust passage 11 on both upstream and downstream sides of the point of connection with the communicating passage 13, and controls the third switching element (the third passage switching valve 33, the third and fifth passage valves 53, 55) into a state in which the communicating passage 13 communicates with the auxiliary exhaust passage 12 only on the upstream side of the point of connection with the communicating passage 13.

This controller for the internal combustion engine determines whether the operation area of the internal combustion engine falls in a predetermined NA operation area in which supercharging action by the turbo charger device is to be stopped. When the operation area of the internal combustion engine is determined to be in the predetermined NA operation area, the first switching element is controlled so as to make the exhaust manifold communicate only with the auxiliary exhaust passage side, the second switching element is controlled so as to make the communicating passage communicate with the main exhaust passage on both the upstream and downstream sides of the point of connection with the communicating passage, and the third switching element is controlled so as to make the communicating passage communicate with the auxiliary exhaust passage only on the upstream side of the point of connection with the communicating passage. By doing so, when the internal combustion engine is in the predetermined NA operation area, exhaust gas from the exhaust manifold is made to flow down the auxiliary exhaust passage, the communicating passage, and the main exhaust passage in this order by not allowing it to pass through either the supercharging turbine or the power turbines. As a result, when the operation area of the internal combustion engine is in the predetermined NA operation area, the exhaust resistance can be further decreased compared to the controller for the internal combustion engine according to the sixth aspect, enabling further improvement of both the fuel economy and market appeal.

According to a ninth aspect of the present disclosure, a controller 1, 1A for the internal combustion engine 3, 3A of the third aspect includes: a parallel operation area determination unit (ECU 2, step 8) which determines whether an operation area of the internal combustion engine 3, 3A falls in a predetermined parallel operation area in which supercharging action by the turbo charger device 6 and regenerative control on the rotary machine (turbine motor 8a) are to be effected; and a parallel operation control unit (ECU 2, step 9) which, when the parallel operation area determination unit determines that the operation area of the internal combustion engine 3, 3A falls in the predetermined parallel operation area (when the determination in step 8 results in YES), controls the first switching element into a state in which the exhaust manifold 10 communicates with both the main exhaust passage 11 side and the auxiliary exhaust passage 12 side, controls the second switching element (the second passage switching valve 32, the second and third passage valves 52, 53) into a state in which the communicating passage 13 does not communicate with the main exhaust passage 11, and controls the third switching element (the third passage switching valve 33, the third and fifth passage valves 53, 55) into a state in which the communicating passage 13 does not communicate with the auxiliary exhaust passage 12.

This controller for the internal combustion engine determines whether the operation area of the internal combustion engine falls in a predetermined parallel operation area in which supercharging action by the turbo charger device and regenerative control on the rotary machine are to be effected. When the operation area of the internal combustion engine is determined to be in the predetermined parallel operation area, the first switching element is controlled so as to make the exhaust manifold communicate with both the main exhaust passage side and the auxiliary exhaust passage side, the second switching element is controlled so as to make the communicating passage not communicate with the main exhaust passage, and the third switching element is controlled so as to make the communicating passage not communicate with the auxiliary exhaust passage. By doing so, when the internal combustion engine is in the predetermined parallel operation area, the exhaust gas from the exhaust manifold is made to flow into both the supercharging turbine side and the power turbine side. Then, the exhaust gas that has passed through the supercharging turbine is made to flow into the main exhaust passage, while the exhaust gas that has passed through the power turbines is made to flow into the auxiliary exhaust passage. As a result, the same operational effects as the controller for the internal combustion engine in the seventh aspect can be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. An internal combustion engine comprising:
an exhaust manifold;
a main exhaust passage into which exhaust gas from the exhaust manifold flows;
an auxiliary exhaust passage which is formed separately from the main exhaust passage such that exhaust gas from the exhaust manifold flows in;
a turbo charger device which includes a supercharging turbine disposed at some midpoint of the main exhaust passage;
a power turbine device which includes power turbines disposed at some midpoint of the auxiliary exhaust passage and a rotary machine coupled to the power turbines;
a communicating passage one end of which is connected with the main exhaust passage at a point downstream of the supercharging turbine and another end of which is connected with the auxiliary exhaust passage at a point upstream of the power turbines, and which communicates with the main exhaust passage and the auxiliary exhaust passage;
a first switching element configured to switch a communication state of the exhaust manifold between a state in which the exhaust manifold communicates only with a main exhaust passage side, a state in which the exhaust manifold communicates only with an auxiliary exhaust passage side, and a state in which the exhaust manifold communicates with both the main exhaust passage side and the auxiliary exhaust passage side; and a second switching element configured to switch the communication state of the communicating passage with the main exhaust passage between a state in which the communicating passage communicates with the main exhaust passage only on an upstream side of a point of connection with the communicating passage, a state in which the communicating passage communicates with the main exhaust passage on both upstream and downstream sides of the point of connection with the communicating passage, and a state in which the communicating passage does not communicate with the main exhaust passage.

2. The internal combustion engine according to claim 1, wherein the auxiliary exhaust passage extends branching off from the main exhaust passage at a point upstream of the supercharging turbine;

the first switching element includes a first passage switching valve disposed near a point where the auxiliary exhaust passage branches off from the main exhaust passage; and the second switching element includes a second passage switching valve disposed near the point of connection of the main exhaust passage and the communicating passage.

3. The internal combustion engine according to claim 1, wherein the power turbine device includes a pair of power turbines concentrically arranged on a single rotating shaft as the power turbines, and the power turbine device is constructed such that two flows of exhaust gas that have passed through the pair of power turbines are discharged in opposite directions to each other along an axis of rotation.

4. A controller for the internal combustion engine according to claim 1, comprising:

an NA operation area determination unit which determines whether an operation area of the internal combustion engine falls in a predetermined NA operation area in which supercharging action by the turbo charger device is to be stopped; and an NA operation control unit which, when the NA operation area determination unit determines that the operation area of the internal combustion engine falls in the predetermined NA operation area, controls the first switching element into a state in which the exhaust manifold communicates only with the auxiliary exhaust passage side, and controls the second switching element into a state in which the communicating passage communicates with the main exhaust passage on both upstream and downstream sides of the point of connection with the communicating passage.

5. A controller for the internal combustion engine according to claim 1, comprising:

a parallel operation area determination unit which determines whether an operation area of the internal combustion engine falls in a predetermined parallel operation area in which supercharging action by the turbo charger device and regenerative control on the rotary machine are to be effected; and a parallel operation control unit which, when the parallel operation area determination unit determines that the operation area of the internal combustion engine falls in the predetermined parallel operation area, controls the first switching element into a state in which the exhaust manifold communicates with both the main exhaust passage side and the auxiliary exhaust passage side, and controls the second switching element into a state in which the communicating passage does not communicate with the main exhaust passage.

6. The internal combustion engine according to claim 1, further comprising:

a third switching element configured to switch the communication state of the communicating passage with the auxiliary exhaust passage between a state in which the communicating passage communicates with the auxiliary exhaust passage only on the upstream side of the point of connection with the communicating passage, a state in which the communicating passage communicates with the auxiliary exhaust passage on both upstream and downstream sides of the point of connection with the communicating passage, and a state in which the communicating passage does not communicate with the auxiliary exhaust passage.

7. The internal combustion engine according to claim 6, wherein the third switching element includes a third passage switching valve disposed near the point of connection of the auxiliary exhaust passage and the communicating passage.

8. A controller for the internal combustion engine according to claim 6, comprising:

an NA operation area determination unit which determines whether an operation area of the internal combustion engine falls in a predetermined NA operation area in which supercharging action by the turbo charger device is to be stopped; and an NA operation control unit which, when the NA operation area determination unit determines that the operation area of the internal combustion engine falls in the predetermined NA operation area, controls the first switching element into a state in which the exhaust manifold communicates only with the auxiliary exhaust passage side, controls the second switching element into a state in which the communicating passage communicates with the main exhaust passage on both upstream and downstream sides of the point of connection with the communicating passage, and controls the third switching element into a state in which the communicating passage communicates with the auxiliary exhaust passage only on the upstream side of the point of connection with the communicating passage.

9. A controller for the internal combustion engine according to claim 6, comprising:

a parallel operation area determination unit which determines whether an operation area of the internal combustion engine falls in a predetermined parallel operation area in which supercharging action by the turbo charger device and regenerative control on the rotary machine are to be effected; and a parallel operation control unit which, when the parallel operation area determination unit determines that the operation area of the internal combustion engine falls in the predetermined parallel operation area, controls the first switching element into a state in which the exhaust manifold communicates with both the main exhaust passage side and the auxiliary exhaust passage side, controls the second switching element into a state in which the communicating passage does not communicate with the main exhaust passage, and controls the third switching element into a state in which the communicating passage does not communicate with the auxiliary exhaust passage.

10. An internal combustion engine comprising:
an exhaust manifold;
a main exhaust passage connected to the exhaust manifold such that exhaust gas from the exhaust manifold flows into the main exhaust passage;
an auxiliary exhaust passage connected to the main exhaust passage at a branch portion such that the exhaust gas from the exhaust manifold flows into the auxiliary exhaust passage;
a turbo charger including a supercharging turbine disposed at the main exhaust passage;
a power turbine apparatus comprising:
a power turbine disposed at the auxiliary exhaust passage; and
a rotary coupled to the power turbine;
a communicating passage connecting with the main exhaust passage and the auxiliary exhaust passage and having one end and another end, the one end being connected with the main exhaust passage at a downstream point with respect to the supercharging turbine, the another end being connected with the auxiliary exhaust passage at an upstream point with respect to the power turbine;
a first switching mechanism to switch a communication state of the exhaust manifold among a first state in which the exhaust manifold communicates with the main exhaust passage and does not communicate with the auxiliary exhaust passage, a second state in which the exhaust manifold communicates with the auxiliary exhaust passage and does not communicate with the main exhaust passage, and a third state in which the exhaust manifold communicates with both the main exhaust passage and the auxiliary exhaust passage; and
a second switching mechanism to switch a communication state of the communicating passage with the main exhaust passage among a fourth state in which the communicating passage communicates with an upstream main exhaust passage of the main exhaust passage located on an upstream side with respect to a connection point at which the main exhaust passage connects with the communicating passage and does not communicate with a downstream main exhaust passage of the main exhaust passage located on a downstream side with respect to the connection point, a fifth state in which the communicating passage communicates with both the upstream main exhaust passage and the downstream main exhaust passage, and a sixth state in which the communicating passage does not communicate with the main exhaust passage.

11. The internal combustion engine according to claim 10, wherein
the auxiliary exhaust passage extends branching off from the main exhaust passage at a point upstream of the supercharging turbine;
the first switching mechanism includes a first passage switching valve disposed near a point where the auxiliary exhaust passage branches off from the main exhaust passage; and
the second switching mechanism includes a second passage switching valve disposed near the connection point of the main exhaust passage and the communicating passage.

12. The internal combustion engine according to claim 10, wherein the power turbine apparatus includes a pair of power turbines concentrically arranged on a single rotating shaft, and the power turbine apparatus is constructed such that two flows of exhaust gas that have passed through the pair of power turbines are discharged in opposite directions to each other along an axis of rotation.

13. A controller for the internal combustion engine according to claim 10, comprising:
an NA operation area determination unit which determines whether an operation area of the internal combustion engine falls in a predetermined NA operation area in which supercharging action by the turbo charger device is to be stopped; and
an NA operation control unit which, when the NA operation area determination unit determines that the operation area of the internal combustion engine falls in the predetermined NA operation area, controls the first switching mechanism into a state in which the exhaust manifold communicates only with the auxiliary exhaust passage, and controls the second switching mechanism into a state in which the communicating passage communicates with the main exhaust passage on both upstream and downstream sides of a point of connection with the communicating passage.

14. A controller for the internal combustion engine according to claim 10, comprising:
a parallel operation area determination unit which determines whether an operation area of the internal combustion engine falls in a predetermined parallel operation area in which supercharging action by the turbo charger device and regenerative control on the rotary are to be effected; and
a parallel operation control unit which, when the parallel operation area determination unit determines that the operation area of the internal combustion engine falls in the predetermined parallel operation area, controls the first switching mechanism into a state in which the exhaust manifold communicates with both the main exhaust passage and the auxiliary exhaust passage, and controls the second switching mechanism into a state in which the communicating passage does not communicate with the main exhaust passage.

15. The internal combustion engine according to claim 10, further comprising:
a third switching mechanism configured to switch a communication state of the communicating passage with the auxiliary exhaust passage between a state in which the communicating passage communicates with the auxiliary exhaust passage only on an upstream side of another connection point with the communicating passage, a state in which the communicating passage communicates with the auxiliary exhaust passage on both upstream and downstream sides of the another connection point with the communicating passage, and a state in which the communicating passage does not communicate with the auxiliary exhaust passage.

16. The internal combustion engine according to claim 15, wherein the third switching mechanism includes a third passage switching valve disposed near the another connection point of the auxiliary exhaust passage and the communicating passage.

17. A controller for the internal combustion engine according to claim 15, comprising:
an NA operation area determination unit which determines whether an operation area of the internal combustion engine falls in a predetermined NA operation area in which supercharging action by the turbo charger device is to be stopped; and an NA operation control unit which, when the NA operation area determination unit determines that the operation area of the internal combustion engine falls in the predetermined NA operation area, controls the first switching mechanism into a state in which the exhaust manifold communicates only with the auxiliary exhaust passage, controls the second switching mechanism into a state in which the communicating passage communicates with the main exhaust passage on both upstream and downstream sides of a point of connection with the communicating passage, and controls the third switching mechanism into a state in which the communicating passage communicates with the auxiliary exhaust passage only on an upstream side of the point of connection with the communicating passage.

18. A controller for the internal combustion engine according to claim 15, comprising:

a parallel operation area determination unit which determines whether an operation area of the internal combustion engine falls in a predetermined parallel operation area in which supercharging action by the turbo charger device and regenerative control on the rotary machine are to be effected; and a parallel operation control unit which, when the parallel operation area determination unit determines that the operation area of the internal combustion engine falls in the predetermined parallel operation area, controls the first switching mechanism into a state in which the exhaust manifold communicates with both the main exhaust passage and the auxiliary exhaust passage, controls the second switching mechanism into a state in which the communicating passage does not communicate with the main exhaust passage, and controls the third switching mechanism into a state in which the communicating passage does not communicate with the auxiliary exhaust passage.

* * * * *